(12) United States Patent
Harrison et al.

(10) Patent No.: US 10,992,420 B2
(45) Date of Patent: Apr. 27, 2021

(54) SELECTIVE SYMBOL REPETITION FOR SFBC ON SPDCCH

(71) Applicant: Telefonaktiebolaget LM Ericsson (publ), Stockholm (SE)

(72) Inventors: Robert Mark Harrison, Grapevine, TX (US); Laetitia Falconetti, Järfälla (SE); Sebastian Faxér, Järfälla (SE); Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/633,832

(22) PCT Filed: Aug. 10, 2018

(86) PCT No.: PCT/SE2018/050811
§ 371 (c)(1),
(2) Date: Jan. 24, 2020

(87) PCT Pub. No.: WO2019/032034
PCT Pub. Date: Feb. 14, 2019

(65) Prior Publication Data
US 2020/0389255 A1    Dec. 10, 2020

Related U.S. Application Data

(60) Provisional application No. 62/544,650, filed on Aug. 11, 2017.

(51) Int. Cl.
*H04L 1/06* (2006.01)
*H04L 1/08* (2006.01)
*H04L 5/00* (2006.01)

(52) U.S. Cl.
CPC .............. *H04L 1/08* (2013.01); *H04L 1/0606* (2013.01); *H04L 5/0044* (2013.01); *H04L 5/0048* (2013.01)

(58) Field of Classification Search
CPC ....... H04L 1/08; H04L 1/0606; H04L 5/0048; H04L 5/0044
See application file for complete search history.

(56) References Cited

U.S. PATENT DOCUMENTS 10,193,727 B1 *   1/2019   Sung ..................... H04L 5/0048
10,298,364 B2 *   5/2019   Werner ................. H04L 5/0007
(Continued)

OTHER PUBLICATIONS

Ericsson, "New Work Item on Shortened TTI and Processing Time for LTE", 3GPP TSG RAN Meeting #72, Busan, Korea, Jun. 13, 2016, pp. 1-9, RP-161234, 3GPP.
(Continued)

*Primary Examiner* — Dac V Ha
(74) *Attorney, Agent, or Firm* — Coats & Bennett, PLLC

(57) ABSTRACT

When the number of Spatial Block Coded (SBC) modulation symbols in a Physical Resource Block (PRB) is not divided evenly by the number of SBC antenna ports, an SBC coded modulation symbol of a group of SBC coded modulation symbols is repeated, where the same Resource Element (RE) location is repeated on all antennas. In some embodiments, the repeated symbol is adjacent to a modulation symbol of the group that is not repeated. In other embodiments, the repeated modulation symbol is in an adjacent subcarrier to the subcarrier that carries the modulation symbol that is repeated. RE groups with relatively larger numbers of non-zero modulation symbols on a given antenna port and PRB occupy different antenna ports in different PRBs.

20 Claims, 20 Drawing Sheets

(56) References Cited

U.S. PATENT DOCUMENTS

2017/0134134 A1* 5/2017 Lee ............... H04W 72/042
2018/0323830 A1* 11/2018 Park .............. H04B 7/024
2019/0097691 A1* 3/2019 Liu ............... H04L 25/0226

OTHER PUBLICATIONS

Tarokh, V. et al., "Space-Time Block Codes From Orthogonal Designs", IEEE Transactions on Information Theory, vol. 45 No. 5, Jul. 1, 1999, pp. 1456-1467, IEEE.

Alamouti, S., "A Simple Transmit Diversity Technique for Wireless Communications", IEEE Journal on Select Areas in Communications, vol. 16 No. 8, Oct. 1, 1998, pp. 1451-1458, IEEE.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.3.0, Jun. 1, 2017, pp. 1-745, 3GPP.

3rd Generation Partnership Project, "3rd Generation Partnership Project; Technical Specification Group Radio Access Network; Evolved Universal Terrestrial Radio Access (E-UTRA); Physical Channels and Modulation (Release 14)", Technical Specification, 3GPP TS 36.211 V14.3.0, Jun. 1, 2017, pp. 1-195, 3GPP.

Qualcomm Inc., "SFBC PDSCH Transmission in CSI-RS Subframes", 3GPP TSG-RAN WG1 #62, Madrid, Spain, Aug. 23, 2010, pp. 1-6, R1-104798, 3GPP.

Renesas Electronics Europe, "On the Orphan RE Issue in CSI-RS Subframes", 3GPP TSG-RAN WG1 Meeting #63bis, Dublin, Ireland, Jan. 17, 2011, pp. 1-5, R1-110186, 3GPP.

Ericsson, "Design Aspects of sPDCCH", 3GPP TSG-RAN WG1 Meeting #90, Prague, Czech Republic, Aug. 21, 2017, pp. 1-12, R1-1712895, 3GPP.

* cited by examiner

FIG. 11B

SELECTIVE SYMBOL REPETITION FOR SFBC ON SPDCCH

This application claims priority to U.S. Provisional Patent Application Ser. No. 62/544,650, filed Aug. 11, 2017, titled "Selective Symbol Repetition for SBC on sPDCCH," the disclosure of which is incorporated herein by reference in its entirety.

TECHNICAL FIELD

The present invention relates generally to wireless communication networks, and in particular to a system and method of modulation symbol repetition to address mismatches between the number of symbols to be pair-wise transmitted and available air interface resources when employing spatial block coding in short TTI control signal transmission.

BACKGROUND

Wireless communication networks are widely deployed, and their use is ubiquitous in many parts of the world. A variety of protocols and corresponding technical specifications controlling wireless communication network structure and operation are known. The Third Generation Partnership Project (3GPP) has become the dominant standards body in this technology, and a currently deployed protocol is known as the Long Term Evolution (LTE). Embodiments of the present invention are described herein within the context of the LTE standard; however, the invention is not limited to LTE environments and may be advantageously applied to a wide variety of wireless communication network protocols, such as the Fifth Generation (5G) 3GPP standard known as New Radio (NR).

Latency Reduction with Short TTI Operation

Packet data latency is one of the performance metrics that vendors, operators and also end-users (via speed test applications) regularly measure. Latency measurements are done in all phases of a radio access network system lifetime—when verifying a new software release or system component, when deploying a system, and when the system is in commercial operation.

Shorter latency than previous generations of 3GPP Radio Access Technologies (RATs) was one performance metric that guided the design of Long Term Evolution (LTE). LTE is also now recognized by the end-users to be a system that provides faster access to the internet and lower data latencies than previous generations of mobile radio technologies.

Packet data latency is important not only for the perceived responsiveness of the system; it is also a parameter that indirectly influences the throughput of the system. HTTP/TCP is the dominant application and transport layer protocol suite used on the internet today. TCP slow start is a congestion control strategy whereby the amount of data transferred over a new connection is initially limited, and ramps up based on HARQ feedback. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling, by addressing the length of a transmission time interval (TTI). In LTE release 8 (Rel-8), a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

Currently, work in 3GPP is ongoing on standardizing "short TTI" (sTTI) operation, where scheduling and transmission can be done on a faster timescale. sTTI can be realized using any duration in time and comprise resources on any number of OFDM or SC-FDMA symbols, and start at any fixed symbol position within the overall subframe. For LTE the focus of the work currently is to only allow the sTTIs to start at fixed positions with time durations of either 2, 3 or 7 symbols. Furthermore, the sTTI is not allowed to cross either slot or subframe boundaries. For further information on sTTI, see 3GPP RP-161234, "New Work Item on shortened TTI and processing time for LTE, Busan, Korea, Jun. 13-16, 2016, the disclosure of which in incorporated herein by reference in its entirety.

The following notation is used herein:
- PUCCH denotes the UL control channel on 1 ms TTI while sPUCCH denotes the UL control channel on a sTTI.
- PUSCH denotes the UL data channel on 1 ms TTI while sPUSCH denotes the UL data channel on a sTTI.
- PDCCH denotes the DL control channel on 1 ms TTI while sPDCCH denotes the DL control channel on a sTTI.
- PDSCH denotes the DL data channel on 1 ms TTI while sPDCCH denotes the DL data channel on a sTTI.

Scheduling sTTI

Different alternatives are possible to schedule an sTTI in UL or DL to a UE. In one alternative, individual UEs receive information about sPDCCH candidates for short TTI via RRC configuration, telling the UE where to look for the control channel for short TTI, i.e., sPDCCH. The DCI for sTTI is included directly in sPDCCH. In another alternative, the DCI for sTTI is split into two parts, a slow DCI sent in PDCCH and a fast DCI sent in sPDCCH. The slow DCI can contain the frequency allocation for a DL and UL short TTI band to be used for short TTI operation; it can also contain refinement about sPDCCH candidate locations.

Control Signaling in LTE

LTE is a mobile broadband wireless communication technology in which transmissions from base stations (referred to as eNBs) to mobile stations (referred to as user equipment, or UE) are sent using Orthogonal Frequency Division Multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot) in the case of normal cyclic prefix. In the case of extended cyclic prefix, an RB consists of 6 OFDM symbols in the time domain. A common term is also a physical resource block (PRB) to indicate the RB in the physical resource. Two PRBs in the same subframe that use the same 12 subcarriers are denoted a PRB pair. This is the minimum resource unit that can be scheduled in LTE.

FIG. 1 depicts a resource element (RE), which is a unit of one subcarrier and 1 OFDM symbol. Thus, a PRB consists of 84 REs. An LTE radio subframe is composed of multiple resource blocks in frequency with the number of PRBs determining the bandwidth of the system and two slots in time.

In the time domain, LTE downlink transmissions are organized into radio frames of 10 ms, each radio frame consisting of ten equally-sized subframes of length $T_{subframe}$=1 ms.

Messages transmitted over the radio link to users can be broadly classified as control messages or data messages. Control messages are used to facilitate the proper operation of the system as well as proper operation of each UE within the system. Control messages could include commands to control functions such as the transmitted power from a UE, signaling of RBs within which the data is to be received by the UE or transmitted from the UE, and so on.

FIG. 2 illustrates that, in Rel-8, the first one to four OFDM symbols in a subframe, depending on the configuration, are reserved to contain such control information. Furthermore, in Rel-11, an enhanced control channel was introduced (EPDCCH), in which PRB pairs are reserved to exclusively contain EPDCCH transmissions, although excluding from the PRB pair the one to four first symbols that may contain control information to UEs of releases earlier than Rel-11. This is illustrated in FIG. 3, depicting a downlink subframe with 10 RB pairs and configuration of three different EPDCCH regions of size 1 PRB pair each. The remaining PRB pairs can be used for PDSCH transmissions.

Hence, the EPDCCH is frequency multiplexed with PDSCH transmissions, in contrast to PDCCH, which is time multiplexed with PDSCH transmissions. The resource allocation (RA) for PDSCH transmissions exists in several RA types, depending on the downlink control information (DCI) format. Some RA types have a minimum scheduling granularity of a resource block group (RBG). See 3GPP Technical Specification (TS) 36.211, which is incorporated herein by reference in its entirety. An RBG is a set of adjacent (in frequency) resource blocks and when scheduling the UE, the UE is allocated resources in terms of RBGs and not individual RBs.

When a UE is scheduled in the downlink from an EPDCCH, the UE shall assume that the PRB pairs carrying the DL assignment are excluded from the resource allocation, i.e. rate matching applies. For example, if a UE is scheduled PDSCH in a certain RBG of size 3 adjacent PRB pairs, and one of these PRB pairs contain the DL assignment, the UE shall assume that the PDSCH is only transmitted in the two remaining PRB pairs in this RBG. Note also that multiplexing of PDSCH and any EPDCCH transmission within a PRB pair is not supported in Rel-11.

The PDCCHs and EPDCCHs are transmitted over radio resources that are shared between several user equipments (UE). Each PDCCH consists of smaller parts, known as control channel elements (CCEs), to enable link adaptation (by controlling the number of CCE a PDCCH is utilizing). It is specified that for PDCCH, a UE has to monitor 4 aggregation levels of CCEs—namely, 1, 2, 4, and 8—for UE-specific search space and 2 aggregation levels of CCEs namely, 4 and 8—for common search space. Each CCE is composed of several Resource Element Groups (REGs).

DL sTTI Layout

An LTE DL subframe is composed of 6 sTTIs. The boundary between the sTTI and the presence of data symbols in a sTTI depends on the length of PDCCH. If PDCCH is 2 or 3 symbols long, the first sTTI, sTTI 0, does not contain any data symbol.

FIG. 4 depicts two patterns of sTTI boundaries. If PDCCH is 1 or 3 OFDM symbols long, the sTTI boundaries follow pattern 1 of FIG. 4. For a 2 OFDM symbol long PDCCH, the sTTI boundaries follow pattern 2.

DL Control Channel for sTTI, sPDCCH

In order to quickly schedule low latency data on the short TTIs, a new short PDCCH (sPDCCH) will be defined. Since the short TTI operation is desired to co-exist with legacy TTI operation, the sPDCCH should be placed in-band within PDSCH, still leaving resources for legacy data.

Legacy control channels PDCCH and EPDCCH use Cell-specific Reference Signal (CRS) and De-Modulation Reference Signal (DMRS) demodulation, respectively. For operation in both these environment, an sPDCCH should support both CRS and DMRS. To ensure resource usage efficiency, resources not used by sPDCCH should be used by sPDSCH (short PDSCH). Similarly, sPDSCH supports both CRS and DMRS based demodulation. As for PDCCH, a CRS based sPDCCH will be able to schedule a DMRS based sPDSCH or a CRS based sPDSCH. As for EPDCCH, a DMRS based sPDCCH will be able to schedule a DMRS based sPDSCH.

To facilitate the definition of the sPDCCH mapping to resource elements special entities are defined: sREG and sCCE. This follows the methodology used so far in the LTE specifications for defining PDCCH and ePDCCH, as described above. Note that the definition of the same mapping can also be done without using these terms or by using equivalent terms.

The main candidate lengths for sPDCCH in time domain are 1 or 2 OFDM symbols for sTTI operation. A 3 OFDM symbol long length is also an option discussed. The eNB has the possibility to configure over RRC one of the allowed length for sPDCCH, i.e. 1 or 2 (or maybe 3) OFDM symbols.

The REs of a PRB in a given OFDM symbol of the sTTI build one sREG. The number of REs in a sREG that effectively can be used by sPDCCH depends on the presence of reference signals such as CRS, CSI-RS or DMRS.

FIG. 5 depicts one example of an sPDCCH to RE mapping. Here, an sPDCCH occupying OFDM symbol 5 of a subframe is shown. (Note that sPDCCH can occupy other OFDM symbols or the other slot of a subframe.) The UE is assumed to receive a 2 port DMRS used for sPDSCH demodulation, and uses 2 CRS ports (whose REs are labeled with R0 and R1) for sPDCCH and possibly PDCCH demodulation. The depicted DMRS pattern for sPDSCH is a candidate option discussed in 3GPP RAN1. PDCCH may occupy OFDM symbol zero. The 9 sPDCCH-bearing REs are labeled S0-S8, respectively. Note that sPDCCH does not occupy REs that are assumed by the UE to carry other reference signals such as CRS and DMRS, which means that 9, rather than 12, REs are available to carry sPDCCH in this example.

sPDCCH may be mapped in a frequency localized or distributed manner. Frequency distributed mapping maps the PRBs of an sCCE to non-adjacent PRBs with sufficient frequency separation to enhance the potential for frequency diversity. Localized mapping maps the PRBs of an sCCE to adjacent or nearby PRBs in order to maximize the potential for beamforming and/or to enhance channel estimation in multipath channels. Assuming as above that the sPDCCH spans only the first OFDM symbol of a 2 symbol sTTI and that an sCCE is composed of 36 REs like an ECCE or a CCE, 3 PRBs are needed to build a sCCE (i.e., 3 sREGs). These 3 PRBs can be distributed over the sPDCCH-PRB-set or can be localized as three consecutive PRBs. FIG. 6 depicts examples of distributed and localized configurations for 4 sCCEs composed of 3 sREGs each within a 1-OFDM Symbol (OS)-sPDCCH-PRB-set consisting of 18 PRBs. OS1 and OS2 denote adjacent OFDM symbols in a subframe. The unused PRBs shown in FIG. 6 can be further assigned for building other sCCE, as well as the possibility to be used for sPDSCH allocation.

Transmit Diversity

Space-Frequency Block Coding (SFBC) has been adopted as the scheme used for transmit diversity (TxD) in LTE. SFBC uses the Alamouti code to spread the information over the antenna ports as well in the frequency domain. The Alamouti code is described in the paper by M. Alamouti, "A simple transmit diversity technique for wireless communications," published in the IEEE Journal on *Selected Areas in Communications* 16 (8): 1451-1458 (October 1998), the disclosure of which is incorporated herein by reference in its entirety. However, SFBC in general includes also an entire class of orthogonal space-frequency (space-time) block codes. See the paper by V. Tarokh, et al., "Space-Time Block Codes from Orthogonal Designs," published in the *IEEE Transactions on Information Theory, July* 1999, the disclosure of which is incorporated herein by reference in its entirety.

For two antenna ports, SFBC takes two symbols $s_k$ and $s_k+1$ at a time as input and distributes these symbols over frequency and space as described by the codeword matrix $$\begin{bmatrix} s_k & s_{k+1} \\ s_{k+1}^c & -s_k^c \end{bmatrix}$$

where the rows correspond to the different antenna ports and the columns correspond to the subcarrier dimension, and ( )° denotes complex conjugate. Typically, two consecutive subcarriers are chosen and, without loss of generality, this will be assumed herein. It should also be noted that the exact representation of the Alamouti-based SFBC matrix is not critical to embodiments of the present invention. The matrix can, for example, be transposed and conjugated in various ways, as well as precoded with a unitary matrix and the result would still be an equivalent Alamouti-based SFBC codeword. Even if such transformed SFBC is used, similar results to those disclosed herein may be obtained. For the four antenna port case, LTE uses a hybrid of SFBC and Frequency Switched Transmit Diversity (FSTD), where SFBC is transmitted on antenna port pairs and the two ports switch from one subcarrier to another. The 2-port SFBC scheme and the 4-port SFBC+FSTD scheme are illustrated in FIGS. 7a and 7b, respectively.

A closely related alternative to SFBC is Space-Time Block Coding (STBC). In STBC, the frequency dimension is replaced by the time dimension, and in LTE the time dimension would likely correspond to consecutive OFDM symbols. It should also be noted that the concept of SFBC/STBC can be generalized to more than two Tx antennas and that combinations of SFBC/STBC and other techniques such as Frequency Switched Transmit Diversity (FSTD) or Cyclic Delay Diversity (CDD) may also be used for larger transmit antenna arrays.

For illustrative purposes, consider a 2 Tx antenna port setup and considering two received vectors corresponding to two consecutive subcarriers. This gives the received matrix $$Y = [y_k \quad y_{k+1}] = H \begin{bmatrix} s_k & s_{k+1} \\ s_{k+1}^c & -s_k^c \end{bmatrix} + [e_k \quad e_{k+1}]$$

where H is a 2×2 matrix containing the channel response, whose columns correspond to transmit antennas and whose rows correspond to two REs carrying the two different transmit symbol combinations (note that it has been assumed that the channel remains constant over the two relevant subcarriers), and $e_k$ is other signals and noise.

Channel State Information Reference Signal (CSI-RS)

In LTE Rel-10, a new channel state information reference signal (CSI-RS) was introduced for the intent to estimate channel state information. The CSI-RS based CSI feedback provides several advantages over the CRS based CSI feedback used in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

Two types of CSI-RS are defined in LTE: non-zero power (NZP) CSI-RS and zero power (ZP) CSI-RS. NZP CSI-RS is transmitted by a network node (or eNB) for UEs to estimate the downlink channels to the network node. While for ZP CSI-RS, one or more CSI-RS resource(s) is/are allocated by the network node but nothing is transmitted on the resources, which can be used to reduce interferences to neighbor cells so that better channel estimation can be performed by the UEs in the neighbor cells.

For a Rel-13 UE, the number of supported antenna ports are 1, 2, 4, 8, 12, 16. In Rel-14, the antenna port numbers have been increased to include 20, 24, 28, 32 ports. FIG. 8 shows the REs available for CSI-RS allocations in a PRB. Up to 40 REs can be configured for CSI-RS. CSI-RS is transmitted over all PRBs. Note that CSI-RS signals are transmitted in all RBs of a system bandwidth, so the same resource allocation is repeated in all RBs. Rel-14 LTE supports that CSI-RS can also be transmitted with reduced density. That is, the CSI-RS signals corresponding to different ports are transmitted in every Nth PRB.

Prior to LTE Rel-14, CSI-RS could only transmitted periodically on certain subframes, also referred to as CSI-RS subframes. A CSI-RS subframe configuration consists of a subframe periodicity and a subframe offset. The periodicity is configurable at 5, 10, 20, 40 and 80 ms. A CSI-RS configuration consists of a CSI-RS resource configuration as specified in Table 6.10.5.2-1 of 3GPP TS36.211 and a CSI-RS subframe configuration as specified in Table 6.10.5.3-1 of 3GPP TS36.211.

An 'aperiodic CSI-RS' was introduced in LTE Rel-14, wherein unlike in the conventional CSI-RS configuration, the UE does not use a subframe configuration associated with the CSI-RS configuration. A UE can be preconfigured with K={1, 2, . . . , 8} CSI-RS resources.

One of the motivations for aperiodic CSI-RS is that the transmission of CSI-RS can occur in any subframe in order for a UE to measure and feedback downlink CSI, and it does not have to be limited to a set of preconfigured subframes. Another motivation is to be able to reduce CSI-RS overhead in the presence of a large number of UEs. For instance, if a large number of UEs are present, allocating periodic CSI-RS resources to each UE in a UE-specific manner will consume a large number of REs and will drive the CSI-RS overhead up. The CSI-RS overhead can be reduced by aperiodic CSI-RS with a pool of CSI-RS resources where the pool can contain a maximum of K resources. The CSI-RS resource pool containing multiple CSI-RS resources can be shared among a group of UEs in which precoded or beamformed CSI-RS for targeting different UEs can be transmitted at different subframes by sharing the common CSI-RS resource pool. The presence of aperiodic CSI-RS can be dynamically triggered in DCI such as an uplink data grant message sent on PDCCH or EPDCCH. An example is shown in FIG. 9. In the dynamic aperiodic CSI-RS indication, the UE is told to measure CSI in the subframe it receives the indication and on which one of the preconfigured CSI-RS resources it should measure CSI. The UE measures CSI on the indicated CSI-RS resource and feeds back the CSI to the UE.

In some cases, not all K preconfigured CSI-RS resource may be needed for instance if the load is varying. Hence, in this case a number N<K of CSI-RS resources may be activated in a more dynamic way to cope with the varying load in the system. If N among the K CSI-RS resources are activated in the UE, the UE can expect to receive aperiodic CSI-RS in one of the N activated CSI-RS resources. The activation of N out of K resources can be done via MAC CE signaling.

Challenges

The use of spatial block coding (SBC) such as SFBC or STBC requires that pairs of REs be used. This means that the number of REs in an sCCE that uses SBC must occupy an even number of REs. As depicted in FIG. 10, there can be an odd number of REs in an sPDCCH. Here, as in FIG. 5, a single-OFDM symbol sPDCCH is shown, where the UE receives PDSCH with two port DMRS and may demodulate sPDCCH or PDCCH with two port CRS. Unlike FIG. 5, two port SFBC is used to transmit the sPDCCH, and here the first antenna port is shown on the left, while the second port is on the right. The SFBC symbol pairs follow the precoding as in FIG. 7, and are indicated by Sn,0 and Sn,1 on the first antenna, and Sn*,0 and Sn*,1 are the SFBC precoded symbols for the second antenna, where the negation and conjugation operations in FIG. 7 are used. Note that the symbol pairs on the second antenna are reversed in the SFBC precoding. The SFBC pairs are mapped on both antennas to the nearest adjacent REs, as shown by the arrows. The symbol pair mapping starts at the lowest subcarrier index. Consequently, the $9^{th}$ RE (that is in subcarrier #10 of OFDM symbol #5 and labeled S8,0 on the first antenna and S9*,1 on the second antenna) in the PRB does not have a pair within the PRB on either antenna, since DMRS occupies the remaining RE. An unpaired SFBC RE (such as S8,0 or S9*,0) is often referred to as an 'orphan' RE in 3GPP parlance.

Note that while in some cases, the nearest subcarrier of an adjacent PRB could be used to pair with an orphan RE in a PRB, this is not the case for distributed sPDCCH mappings, as can be seen from FIG. 6, where the PRBs are not adjacent. Such distributed mappings are desirable to increase frequency diversity, which is where SFBC should be used as well.

One prior art solution to this problem is to leave the unpaired RE (S8,0 in this case) unoccupied by sPDCCH. This has the drawback of leaving one RE out of 9 unavailable for sPDCCH, which is likely to be unusable for other purposes, effectively wasting 11% of sPDCCH capacity.

In another scenario, a UE may be configured to receive CSI-RS in addition to DMRS. The CSI-RS may occur in OFDM symbols 9 and 10 where DMRS is not present. In such a case, if an sTTI occurs in OFDM symbols 9 and 10 and if an odd number of 2 port CSI-RSs (including one 2 port CSI-RS) are configured in symbols 9 and 10, there will be an odd number of sPDCCH REs in OFDM symbols 9 and 10. On the other hand, if multiple 4 port CSI-RS configurations are used in symbols 9 & 10, then the number of CSI-RS ports is always even. Therefore, when one or two ports CSI-RS is configured, one prior art solution to ensure that SFBC pairing is always possible is to assume 4 ports CSI-RS in symbols 9 & 10 for SFBC symbol mapping purpose. However, this wastes overhead if only 2 port CSI-RS is needed.

In some scenarios, a UE may receive aperiodic CSI-RS, which means that the CSI-RS is only present in a given subframe when it is aperiodically triggered via DCI. If aperiodic CSI-RS is present in the same OFDM symbol as an sPDCCH, it may not be feasible for the UE to determine which REs carry the aperiodic CSI-RS and which carry the sPDCCH. Therefore, the UE would have to use other means than the content of sPDCCH to determine if CSI-RS is present.

SFBC mapping for sPDCCH may also be complicated by sPDSCHs intended for different UEs that are multiplexed together with an sPDCCH. It may be possible that an sPDCCH may occupy a first PRB with a first sPDCCH for a first UE, and a second PRB with a second sPDCCH for a second UE. Furthermore, the sPDSCHs could have different rank; for example, the first sPDCCH could be rank 1, while the second sPDCCH could be rank 3. It is possible that DMRS requires D REs per OFDM symbol for rank 1, and requires 2D REs per OFDM symbol for rank 3, and so the first PRB would have D DMRS REs in the OFDM symbol carrying sPDCCH, while the second PRB would have 2D DMRS REs in the OFDM symbol carrying sPDCCH. Consequently, the number of REs available for SFBC could be odd in the first PRB and even in the second PRB, in which case a mechanism is needed to allow the 'orphan' RE in the first PRB to be used for SFBC, but may not be needed for the second PRB. Using different SFBC mappings in different PRBs may not be desirable from a UE complexity standpoint. As such, a mechanism allowing the same SFBC mapping in all PRBs of an sPDCCH would be advantageous.

Four port SFBC+FSTD mappings have even more severe 'orphan' problems than two antenna port SFBC. FIG. 11 shows the case where a two port CSI-RS occupies OFDM symbol 9 where sPDCCH is mapped. Because 4 antennas are used, the SFBC symbols are grouped into fours, and so the symbol number in a group varies from 0 to 3. Since FSTD is used, some subcarriers are not transmitted upon, which is indicated by REs with '0's. Here we observe that a normal SFBC mapping can be used for antenna ports 0 and 2, since there are complete SFBC pairs on these antennas, and the zeroed subcarriers do not require pairing.

However, antenna ports 1 and 3 contain an orphan RE in subcarrier 11 (S10,2 and S11*,2, respectively). Prior art solutions would leave all REs of the 4 RE group empty, losing subcarriers 9 and 10 on antenna ports 0 and 2 and subcarrier 11 on ports 1 and 3, for a total of 3 unique modulation symbols. Therefore, instead of carrying 11 modulation symbols in a PRB, 4 port SFBC would only be able to carry 8, or a 27% loss of available sPDCCH REs.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, when the number of SBC coded modulation symbols in a PRB is not divided evenly by the number of SBC antenna ports, an SBC coded modulation symbol of a group of SBC coded modulation symbols is repeated, where the same RE location is repeated on all antennas. In some embodiments, the repeated symbol is adjacent to a modulation symbol of the group that is not repeated. In other embodiments, the repeated modulation symbol is in an adjacent subcarrier to the subcarrier that carries the modulation symbol that is repeated. RE groups with relatively larger numbers of non-zero modulation symbols on a given antenna port and PRB occupy different antenna ports in different PRBs. In some embodiments, the repeated symbol occurs in an RE corresponding to a 4 port CSI-RS, while the other RE of the 4 port CSI-RS is occupied by a 2 port CSI-RS. When aperiodic CSI-RS can be triggered by sPDCCH, the UE assumes that the aperiodic CSI-RS is not in an OFDM symbol carrying the sPDCCH. In one embodiment, two or more sPDSCHs may be multiplexed in the PRBs containing an sPDCCH that uses SFBC, and DMRSs associated with the sPDSCHs are code division multiplexed across OFDM symbols. The number of sPDSCH DMRS REs is constrained to be the same in all subcarriers containing an sPDCCH in an OFDM symbol.

One embodiment relates to a method, performed by a base station operative in a wireless communication network, of selectively repeating a modulation symbol in an antenna diversity transmission of a control channel. A plurality of Resource Elements (REs) is divided into multiple pluralities of RE groups. In this division, each plurality of RE groups is associated with an antenna port; one or more RE groups of each plurality of RE groups comprise M REs, and one RE group of each plurality of RE groups comprises N1 REs, where N1 differs from M; and groups of modulation symbols correspond to the RE groups. For each plurality of RE groups, a modulation symbol of a group of modulation symbols corresponding to the RE group of N1 REs is copied. The modulation symbols within each plurality of RE groups are transmitted on the antenna port associated with the plurality of RE groups.

Another embodiment relates to a method of receiving a control channel in a User Equipment (UE) operative in a wireless communication network. A predetermined number of Demodulation Reference Signal (DMRS) Resource Elements (REs) used for reception of a different physical channel than the control channel are assumed to be present in each Orthogonal Frequency Division Multiplexing (OFDM) symbol carrying the control channel.

Yet another embodiment relates to a method of receiving a control channel in a User Equipment (UE) operative in a wireless communication network. It is identified which Resource Elements (REs) contain the control channel and which contain a reference signal not used for reception of the control channel according to when the reference signal is not present in the REs. Control channel information carried in the control channel that indicates the presence of the reference signal is received in a set of Orthogonal Frequency Division Multiplexing (OFDM) symbols, the set of OFDM symbols containing the REs.

Still another embodiment relates to a base station operative in a wireless communication network. The base station includes one or more antennas and a transceiver operatively connected to the antennas. The base station further includes processing circuitry operatively connected to the transceiver. The processing circuitry is operative to divide a plurality of Resource Elements (REs) into multiple pluralities of RE groups. In this division, each plurality of RE groups is associated with an antenna port; one or more RE groups of each plurality of RE groups comprise M REs, and one RE group of each plurality of RE groups comprises N1 REs, where N1 differs from M; and groups of modulation symbols correspond to the RE groups. The processing circuitry is further operative to, for each plurality of RE groups, copy a modulation symbol of a group of modulation symbols corresponding to the RE group of N1 REs; and transmit the modulation symbols within each plurality of RE groups on the antenna port associated with the plurality of RE groups.

Still another embodiment relates to a User Equipment (UE) operative in a wireless communication network. The UE includes one or more antennas and a transceiver operatively connected to the antennas. The UE further includes processing circuitry operatively connected to the transceiver. The processing circuitry is operative to receive a control channel by identifying which Resource Elements (REs) contain the control channel and which contain a reference signal not used for reception of the control channel according to when the reference signal is not present in the REs; and receiving control channel information carried in the control channel that indicates the presence of a reference signal in set of Orthogonal Frequency Division Multiplexing (OFDM) symbols, the set of OFDM symbols containing the REs.

Still another embodiment relates to a method, performed by a User Equipment (UE) operative in a wireless communication network, of receiving a control channel wherein a modulation symbol in an antenna diversity transmission of the control channel has been selectively repeated. A plurality of Resource Elements (REs) is divided into multiple pluralities of RE groups. In this division, each plurality of RE groups is associated with an antenna port; one or more RE groups of each plurality of RE groups comprise M REs, and one RE group of each plurality of RE groups comprises N1 REs, where N1 differs from M; and groups of modulation symbols correspond to the RE groups. For each plurality of RE groups, it is determined that a modulation symbol of a group of modulation symbols corresponding to the RE group of N1 REs has been copied. The modulation symbols within each plurality of RE groups are received, wherein the modulation symbols within each plurality of RE groups have been transmitted on the antenna port associated with the plurality of RE groups.

Still another embodiment relates to a non-transitory computer readable medium having stored thereon instructions operative to cause processing circuitry on a base station operative in a wireless communication network to selectively repeat a modulation symbol in an antenna diversity transmission of a control channel. The instructions cause the processing circuitry to perform the steps of dividing a plurality of Resource Elements (REs) into multiple pluralities of RE groups, wherein each plurality of RE groups is associated with an antenna port, one or more RE groups of each plurality of RE groups comprise M REs, and one RE group of each plurality of RE groups comprises N1 REs, and groups of modulation symbols correspond to the RE groups; and for each plurality of RE groups, copying (106) a modulation symbol of a group of modulation symbols corresponding to the RE group of N1 REs; and transmitting (108) the modulation symbols within each plurality of RE groups on the antenna port associated with the plurality of RE groups.

Still another embodiment relates to a non-transitory computer readable medium having stored thereon instructions operative to cause processing circuitry on User Equipment (UE), operative in a wireless communication network, to receive a control channel. The instructions cause the processing circuitry to perform the steps of assuming that a predetermined number of Demodulation Reference Signal (DMRS) Resource Elements (REs) used for reception of a different physical channel than the control channel are present in each Orthogonal Frequency Division Multiplexing (OFDM) symbol carrying the control channel; and receiving control channel information in the REs of the OFDM symbol other than the assumed DMRS REs.

Still another embodiment relates to a non-transitory computer readable medium having stored thereon instructions operative to cause processing circuitry on User Equipment (UE), operative in a wireless communication network, to receive a control channel. The instructions cause the processing circuitry to perform the steps of identifying which Resource Elements (REs) within a symbol carrying the control channel contain control channel information and which REs contain a reference signal not used for reception of the control channel, according to when the reference signal is not present in the REs; and receiving control channel information carried in the control channel that indicates the presence of the reference signal in a set of Orthogonal Frequency Division Multiplexing (OFDM) symbols, the set of OFDM symbols containing the REs.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 11B:
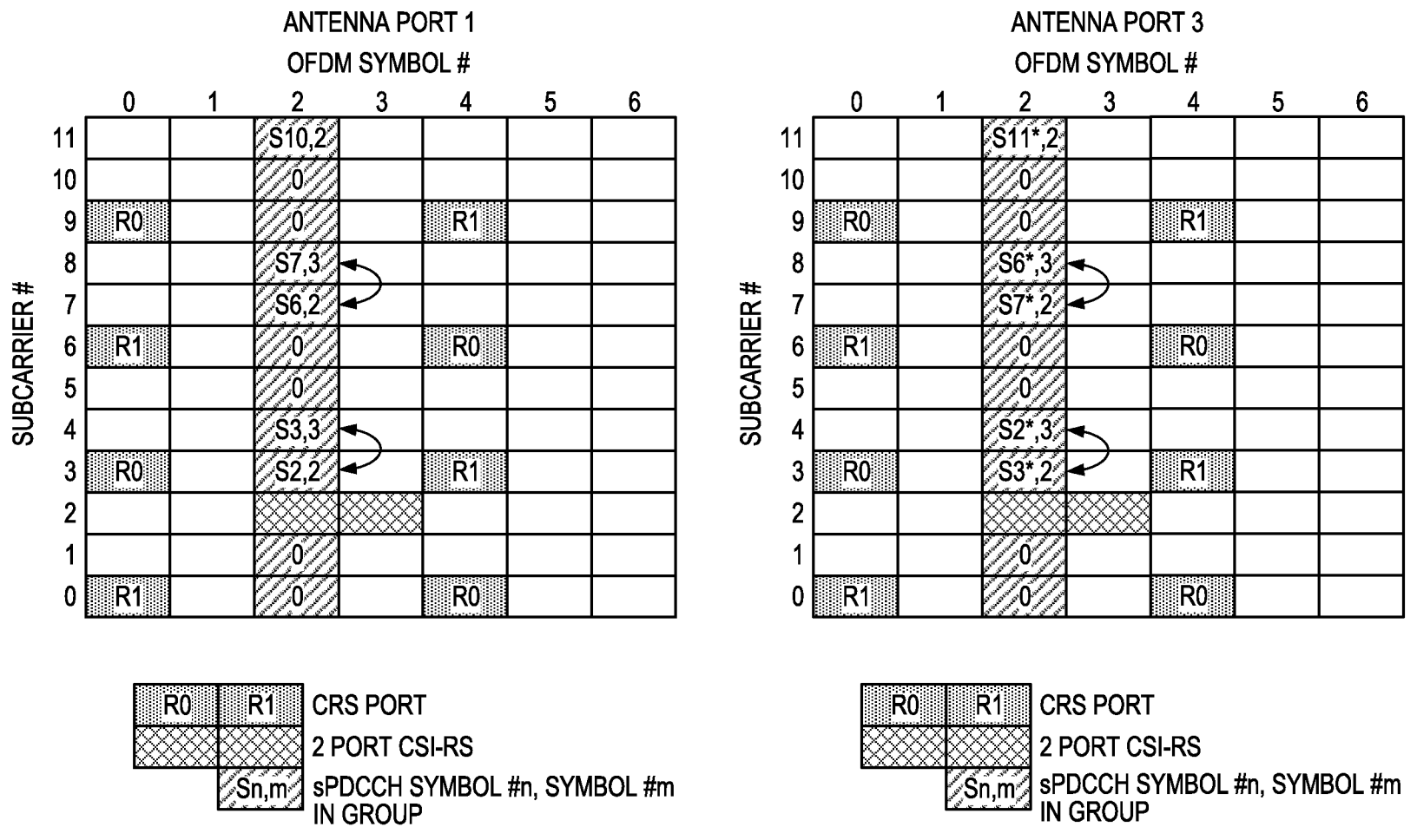

FIGS. 11a and 11b depict four time/frequency grids of a subframe for four antenna ports, depicting the pairing of REs when SBC is used and showing unpaired, or orphaned, REs.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
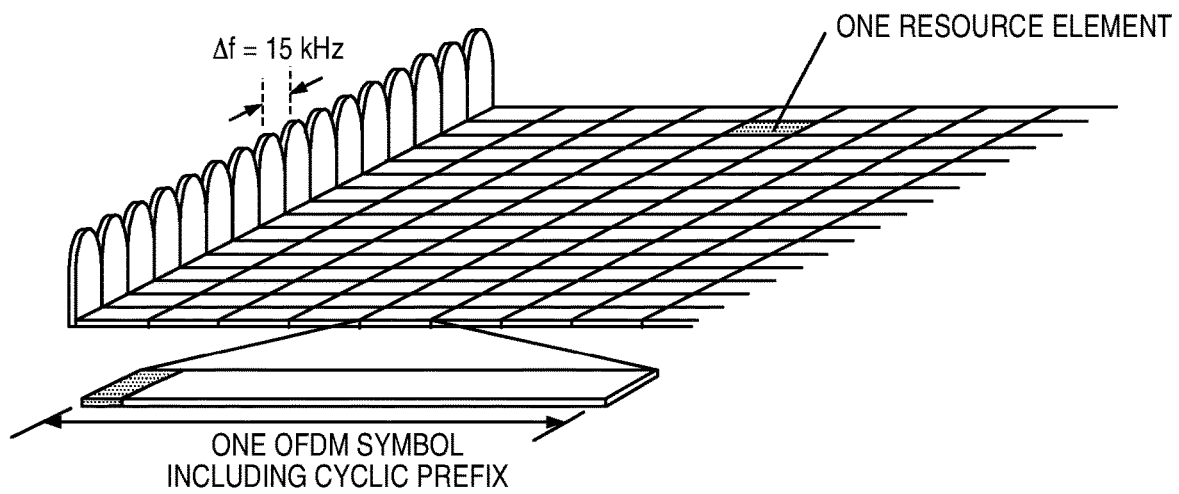
FIG. 1 is a perspective representation of the LTE downlink physical resource.
Figure 2:
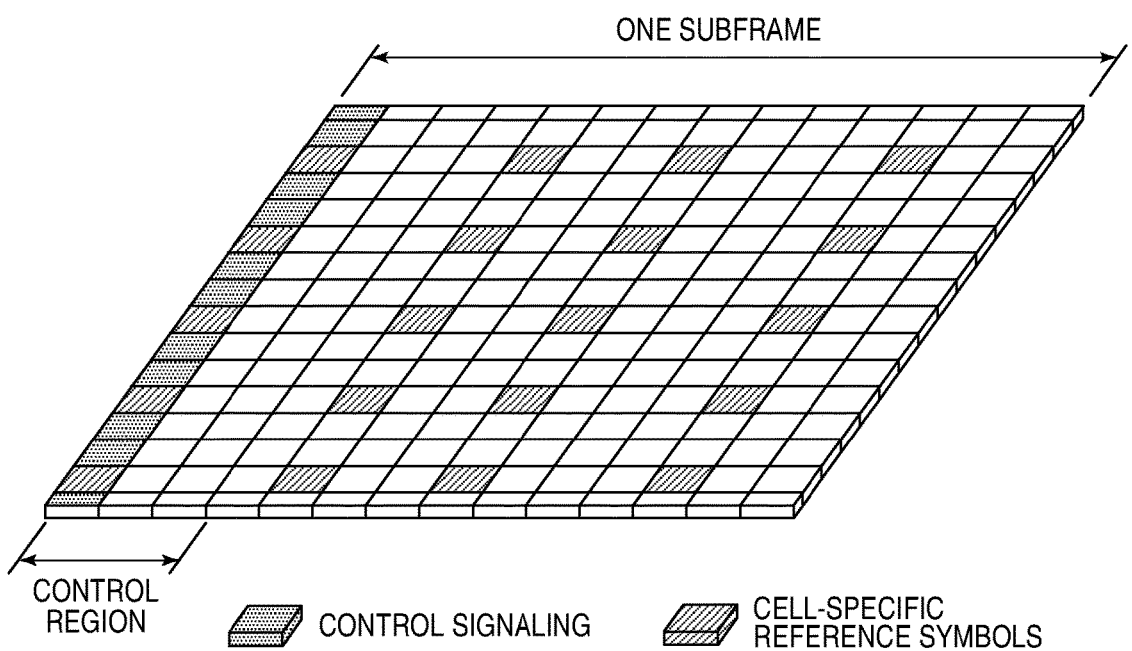
FIG. 2 is a perspective representation of an LTE downlink subframe.
Figure 3:
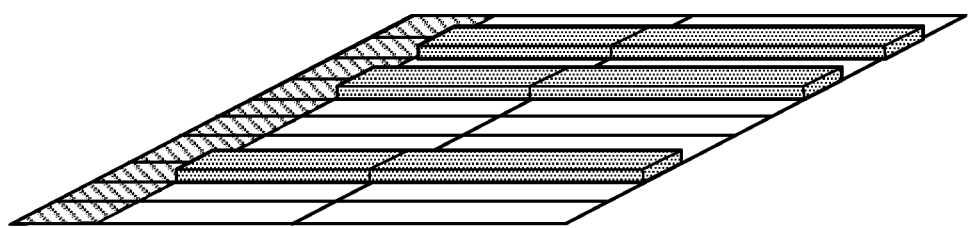
FIG. 3 is a perspective representation of an LTE downlink subframe carrying three ePDCCH transmissions.
Figure 4:
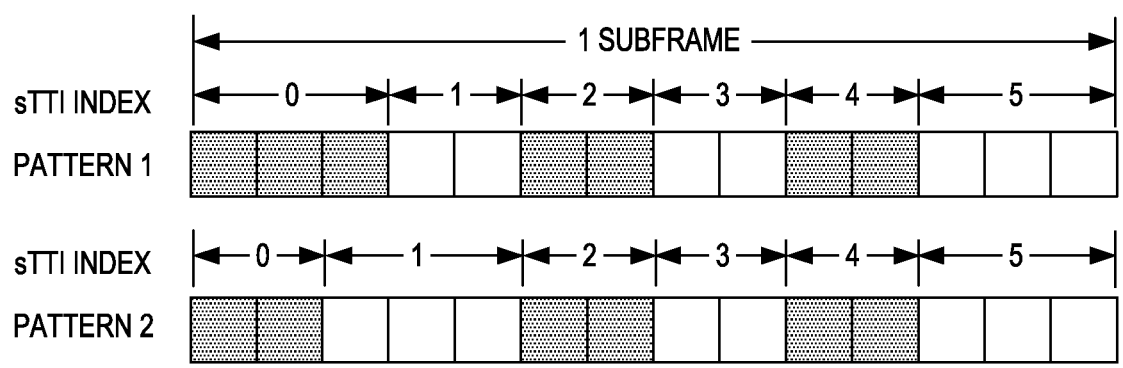
FIG. 4 is a graph of two LTE downlink sPDCCH transmissions in sTTI.
Figure 5:
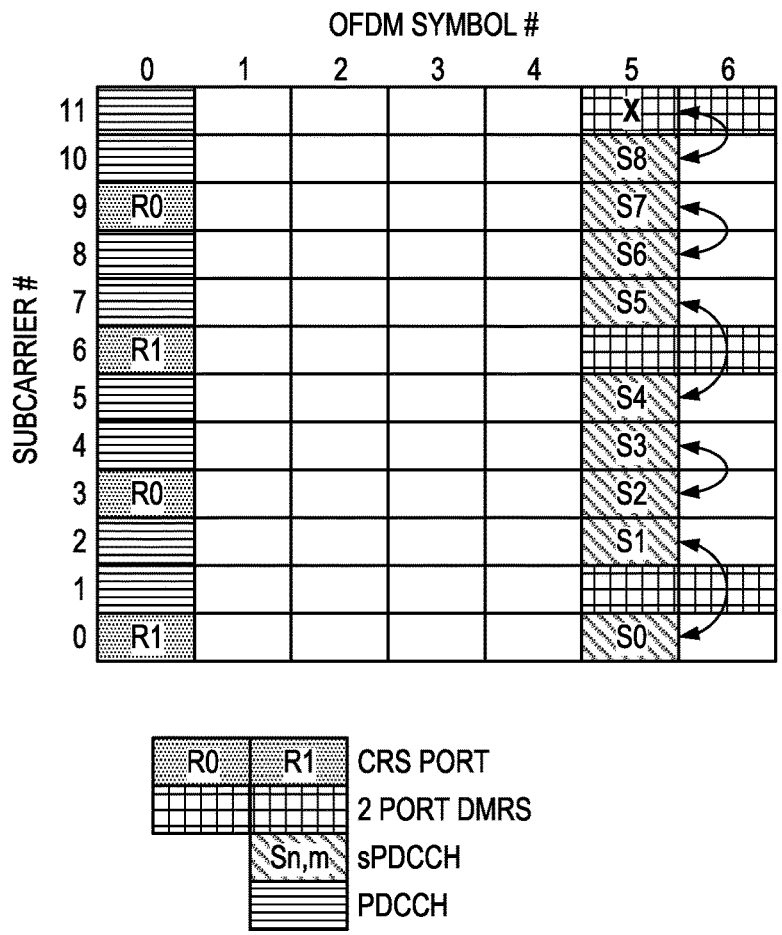
FIG. 5 is a time/frequency grid depicting an sPDCCH to RE mapping.
Figure 6:
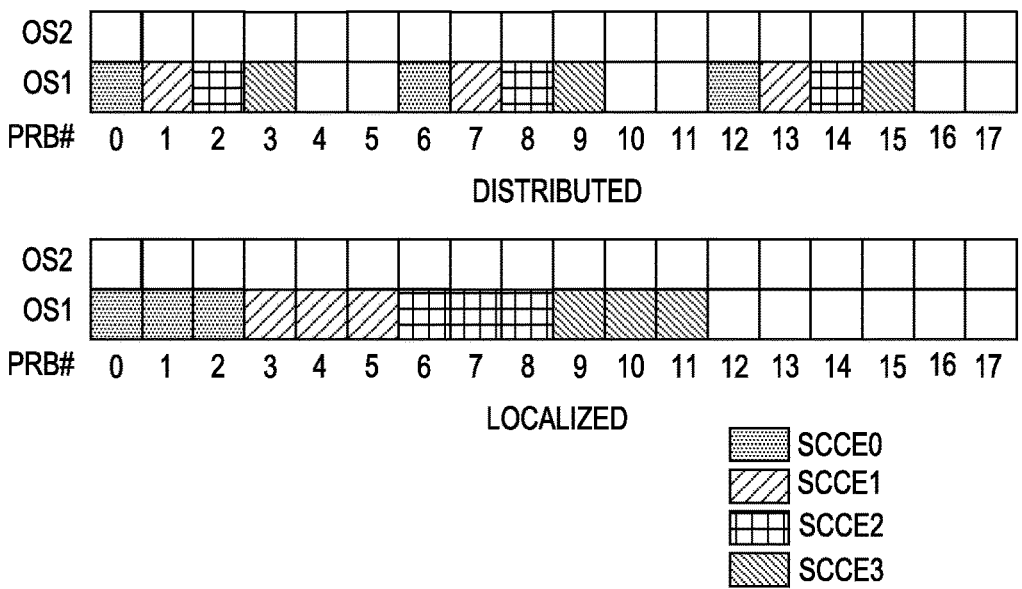
FIG. 6 is a block diagram showing distributed and local configurations for four sCCE.
Figure 7:
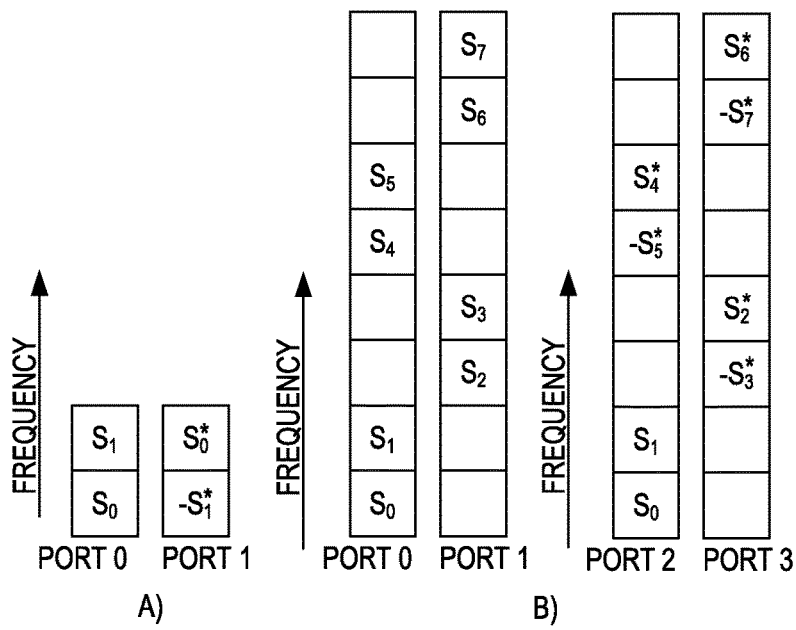
FIG. 7a is an antenna port/frequency illustration of 2-port transmit diversity using SFBC.
FIG. 7b is an antenna port/frequency illustration of 4-port transmit diversity using SFBC+FSTD.
Figure 8:
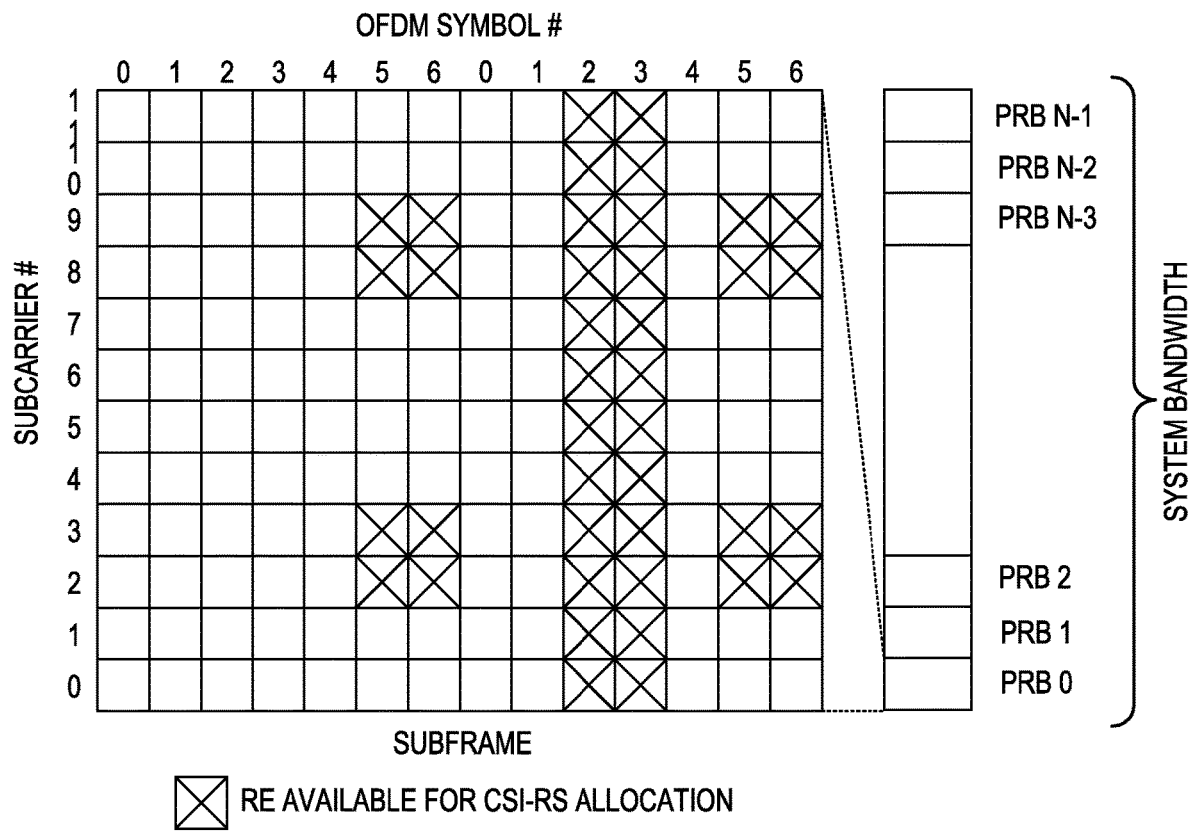
FIG. 8 is a time/frequency grid of a subframe showing CSI-RS allocation, and its position in system bandwidth.
Figure 9:
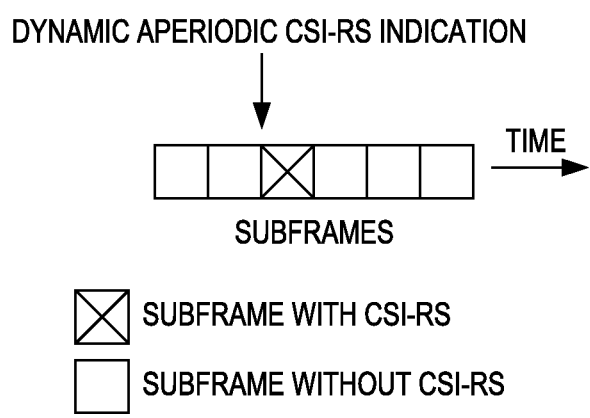
FIG. 9 is a graph depicting subframes with and without aperiodic CSI-RS.
Figure 10:
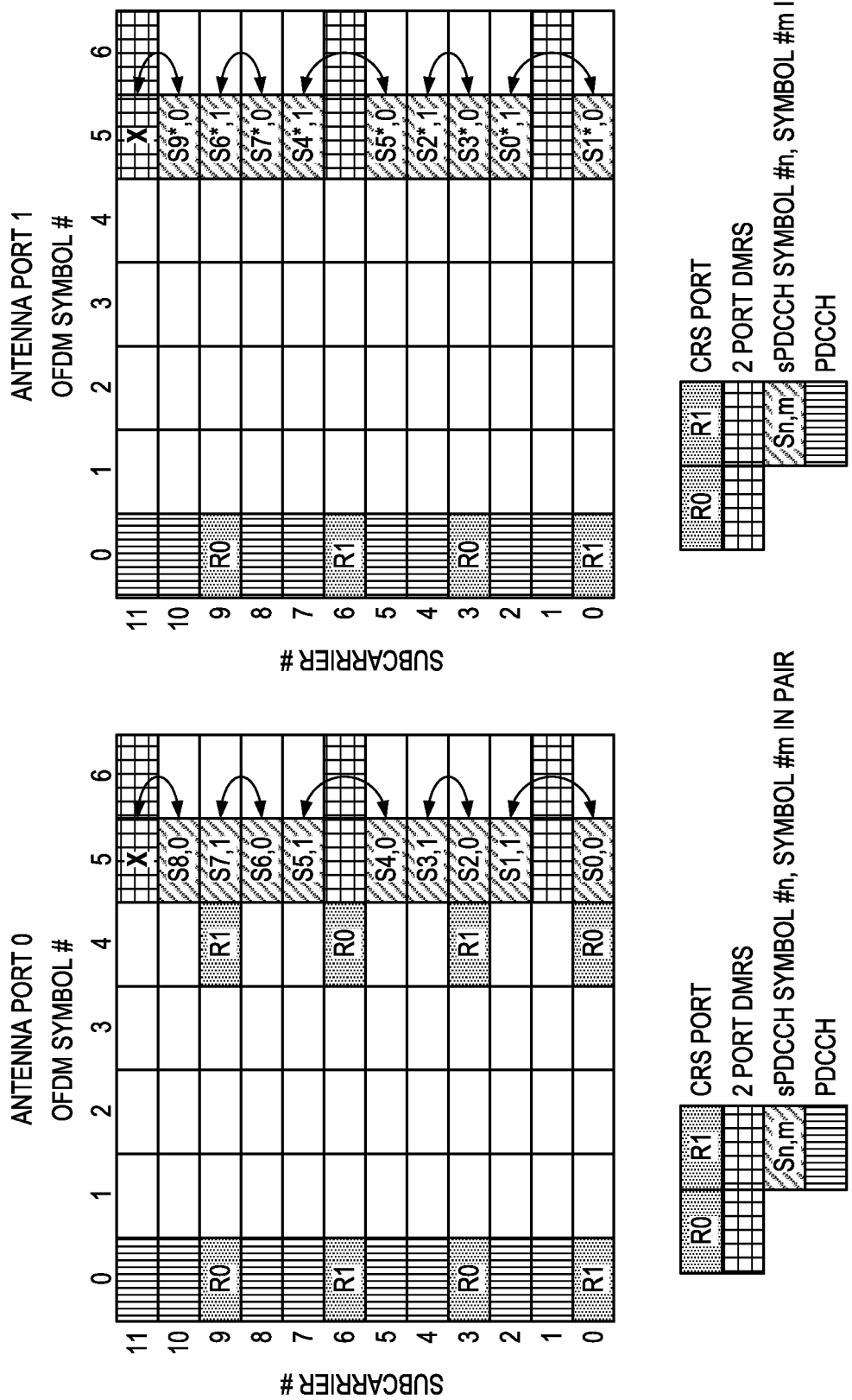
FIG. 10 depicts two time/frequency grids of a subframe for two antenna ports, depicting the pairing of REs when SBC is used and showing unpaired, or orphaned, REs.
Figure 11A:
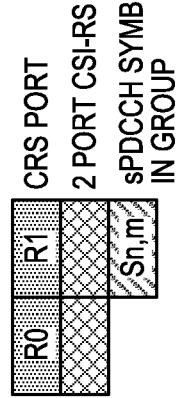
Figure 11A:
Figure 12:
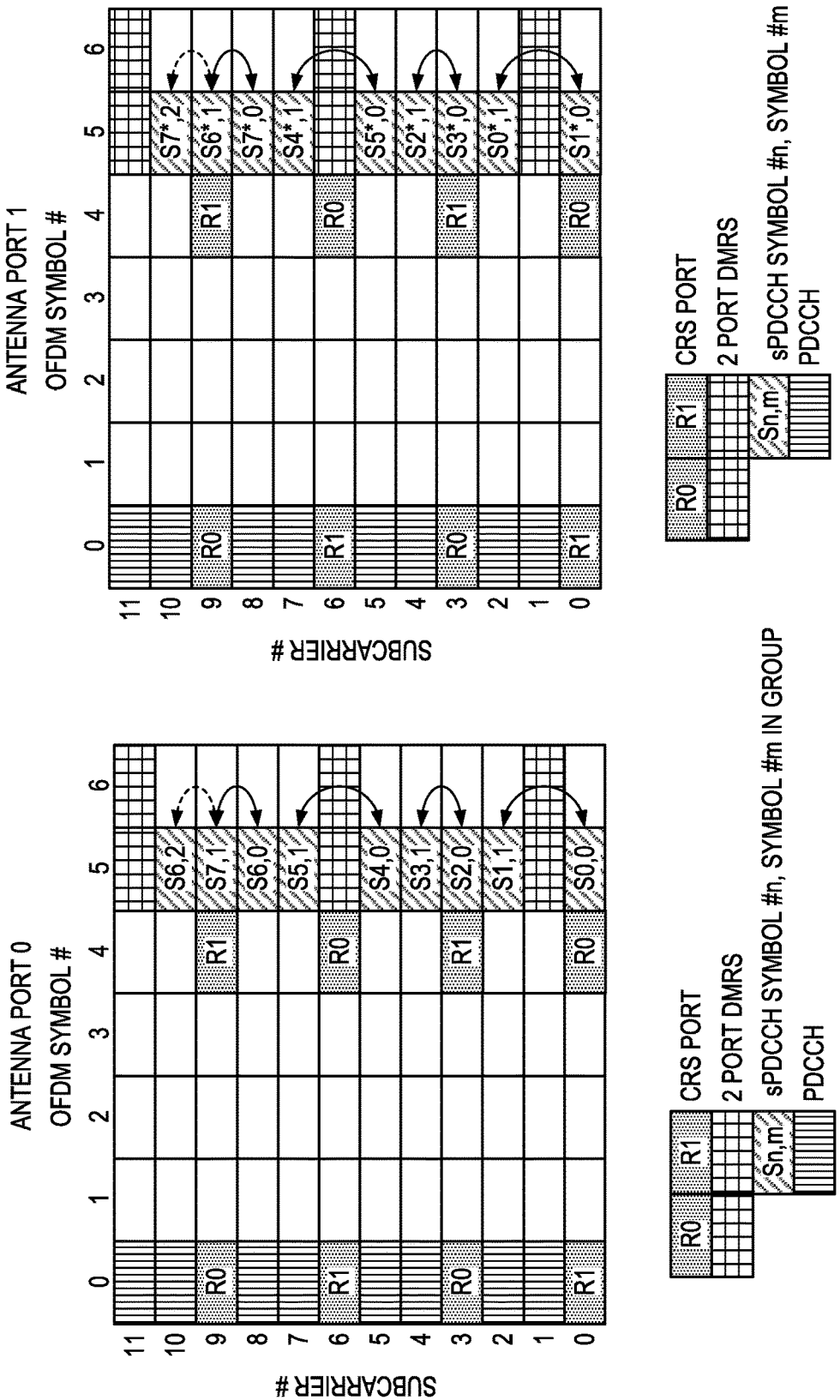
FIG. 12 depicts two time/frequency grids of a subframe for two antenna ports, depicting the pairing of REs when SBC is used and showing the repetition of symbols due to DMRS.

FIG. 12 depicts an embodiment wherein the UE receives two port SFBC encoded sPDCCH carried in a single-OFDM symbol and a sPDSCH with DMRS. Furthermore, the UE may demodulate sPDCCH or PDCCH with two port CRS. It is furthermore assumed in this embodiment that a distributed mapping of the sPDCCH is used, although the embodiment may also apply to contiguously mapped ('localized') sPDCCH.

Let the number of REs available to the sPDCCH in each PRB be Ns. Starting with the lowest subcarrier index, REs on each antenna port are grouped into $$N_g = \left\lfloor \frac{N_s}{2} \right\rfloor$$

groups, where $\lfloor \ \rfloor$ denotes the floor operator. If Ns is an odd number, then one 'orphan' SFBC encoded modulation symbol in one of the $N_g$ groups on each antenna is repeated, resulting in 3 symbols in that group. The repeated modulation symbol is close to the RE containing the symbol it is repeated from, in order to keep the channel response of the two symbols sufficiently similar.

In the embodiment of FIG. 12, there are then $$N_g = \left\lfloor \frac{9}{2} \right\rfloor = 4$$

groups composed of the following modulation symbols on antenna port 0: ({S0,0; S1,1},{S2,0; S3,1},{S4,0; S5,1}, {S6,0; S7,1; S6,2}) and on antenna port 1: ({S1*,0; S0*, 1},{S3*,0; S2*,1},{S5*,0; S4*,1},{S7*,0; S6*,1; S7*,2}). The last group contains one repeated symbol: S6,2 on the first antenna and S7*,2 on the second antenna. Each of the repetitions of S6 can be paired with S7 on the first antenna, and repetitions of S7* can be paired with S6* on the second antenna, as indicated by the solid and dashed arrows. Furthermore, the repeated symbol is on either side of the symbol it is paired with, which minimizes any channel variation between S7,1 or S6*,1 and the two repetitions of S6 or S7*, respectively.

In another embodiment, the last symbol in the last symbol pair in an OFDM symbol of each PRB is repeated in the last RE. Using the example of FIG. 12, S7,1 and S6*,1, on the first and second antennas, respectively, would be repeated.

As discussed above, for PRBs configured for sPDCCH but also shared with sPDSCH, it may be possible that an sPDCCH may occupy a first PRB with a first sPDSCH that is rank 1 and a second PRB with a second sPDSCH that is rank 3. Presuming that DMRS ports are code division multiplexed (CDM'd) over adjacent OFDM symbols, and that rank 1 requires D DMRS REs per OFDM symbol, and rank 3 requires 2D DMRS REs per OFDM symbol, the first PRB would have D DMRS REs in the OFDM symbol carrying sPDCCH, while the second PRB would have 2D DMRS REs in the OFDM symbol carrying sPDCCH. Consequently, the number of REs available for SFBC could be odd in the first PRB and even in the second PRB, in which case a mechanism is needed to allow the 'orphan' RE in the first PRB to be used for SFBC, such as one of the selective symbol repetition embodiments above, but may not be needed for the second PRB. Using different SFBC mapping approaches in different PRBs may not be desirable from a UE complexity standpoint. As such, a mechanism allowing the same SFBC mapping in all PRBs of an sPDCCH may be desirable.

Therefore, in an embodiment where DMRS ports are code division multiplexed (CDM'd) over OFDM symbols, the UE assumes that a predetermined number of DMRS REs are present in each OFDM symbol carrying an sPDCCH using SFBC. The predetermined number may be fixed in specification, or it may be configured in the UE by signaling. Furthermore, the number of DMRS REs present in an OFDM symbol carrying sPDCCH may be identified by the number of DMRS ports. In some such embodiments, the number of DMRS ports may be 1 or 2.

In other embodiments, a localized mapping of the sPDCCH is used. In this case, there is no need to work on a PRB-level basis and apply the repetition on each PRB, since the symbols of an sCCE are not distributed in frequency but rather locally mapped to consecutive PRBs. The grouping is instead performed over the 3 consecutive PRBs constituting the sCCE.

Figure 13:
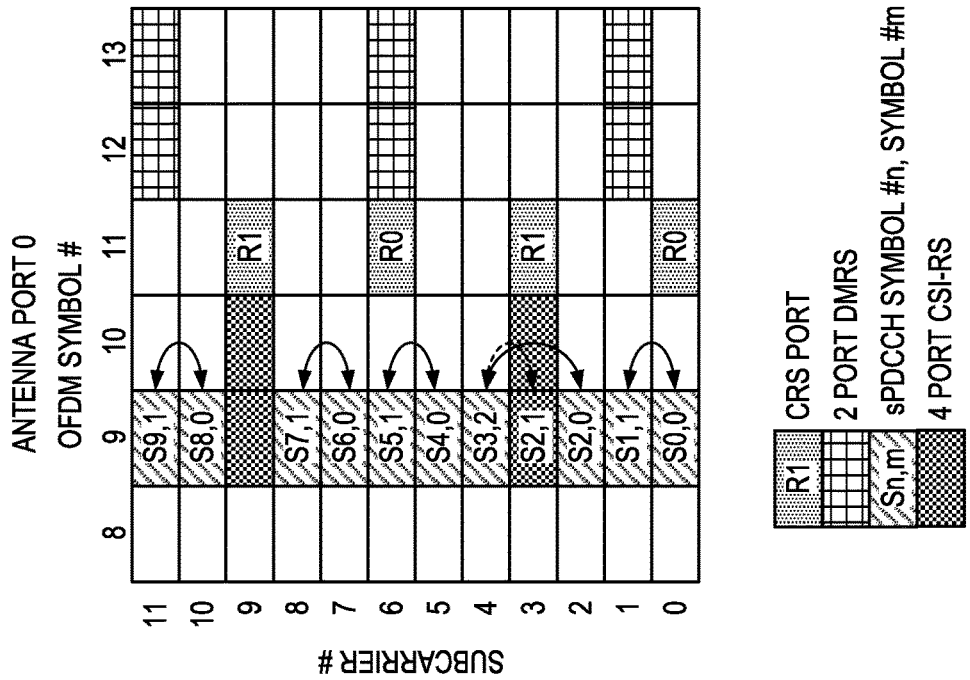
FIG. 13 shows a time/frequency grid of a subframe, depicting the pairing of REs when SBC is used and showing the repetition of a symbol due to CSI-RS.

In another embodiment, such as when a UE is configured to receive one or two ports CSI-RS in OFDM symbols 9 and 10 where DMRS is not present, the same approach can be used as in the case when DMRS is configured, as shown in FIG. 13. The symbols are broken into groups of two, except for the last group, which has 3 symbols when the number of symbols per PRB, Ns, is an odd number. The first symbol of the last group (S8,0) is repeated, and mapped to the RE neighboring the other symbol (S9,1) in the group.

In another embodiment, the last symbol in the last symbol pair in an OFDM symbol of each PRB is repeated in the last RE, i.e., S9,1 would be repeated in the embodiment in FIG. 13.

In another embodiment, when a UE is configured with aperiodic CSI-RS, the presence of CSI-RS will be indicated by DCI. Because PDCCH precedes both CSI-RS and sPDCCH in a subframe, if the DCI is carried in PDCCH, the UE can decode PDCCH, and then determine if CSI-RS is present in an OFDM symbol carrying sPDCCH. Therefore, in an embodiment, a UE receives and successfully decodes a grant in DCI carried by PDCCH indicating the presence of CSI-RS, receives sPDCCH in REs other than those containing the indicated CSI-RS, and receives CSI-RS in the indicated REs. A UE configured for SFBC on sPDCCH then groups the modulation symbols and selectively repeats symbols within a group that has insufficient modulation symbols, according to one or more of the embodiments described above.

In some scenarios, it is not feasible to determine the presence of an aperiodic CSI-RS in OFDM symbols carrying sPDCCH. For example, if an aperiodic CSI-RS transmission is indicated by DCI in an sPDCCH, and the aperiodic CSI-RS is present in an OFDM symbol carrying the sPDCCH, the UE may not know which REs carry the aperiodic CSI-RS and which carry the sPDCCH. Therefore, the UE would have to use other means than the content of sPDCCH to determine if CSI-RS is present.

Therefore, in an embodiment where DCI carried in sPDCCH indicates the presence of aperiodic CSI-RS, the UE assumes that aperiodic CSI-RS is not present in the OFDM symbols carrying an sPDCCH that it is attempting to receive. In other words, the UE receives the sPDCCH according to when the aperiodic CSI-RS is not present in REs where the sPDCCH could be mapped. This may imply that the UE does not expect the sPDCCH DCI to contain an aperiodic CSI-RS trigger in sTTIs containing OFDM symbols that can carry an aperiodically triggered CSI-RS. OFDM symbols that can carry an aperiodicially triggered CSI-RS may be identified by a CSI reference signal configuration, as defined in 3GPP TS 36.211, and signaled by the field resourceConfig-r11 within information element CSI-RS-ConfigNZP in 3GPP TS 36.331.

A UE configured for SFBC on sPDCCH where the sPDCCH may carry an aperiodic CSI-RS trigger will then group the modulation symbols and selectively repeat symbols, according to one or more of the embodiments above. When grouping the modulation symbols, such a UE will assume that aperiodic CSI-RS is not present in an OFDM symbol carrying the sPDCCH. Additionally or alternatively, the UE may not expect that DCI in the sPDCCH will carry an aperiodic CSI-RS trigger in sTTIs containing OFDM symbols that can carry an aperiodically triggered CSI-RS.

Figure 14:
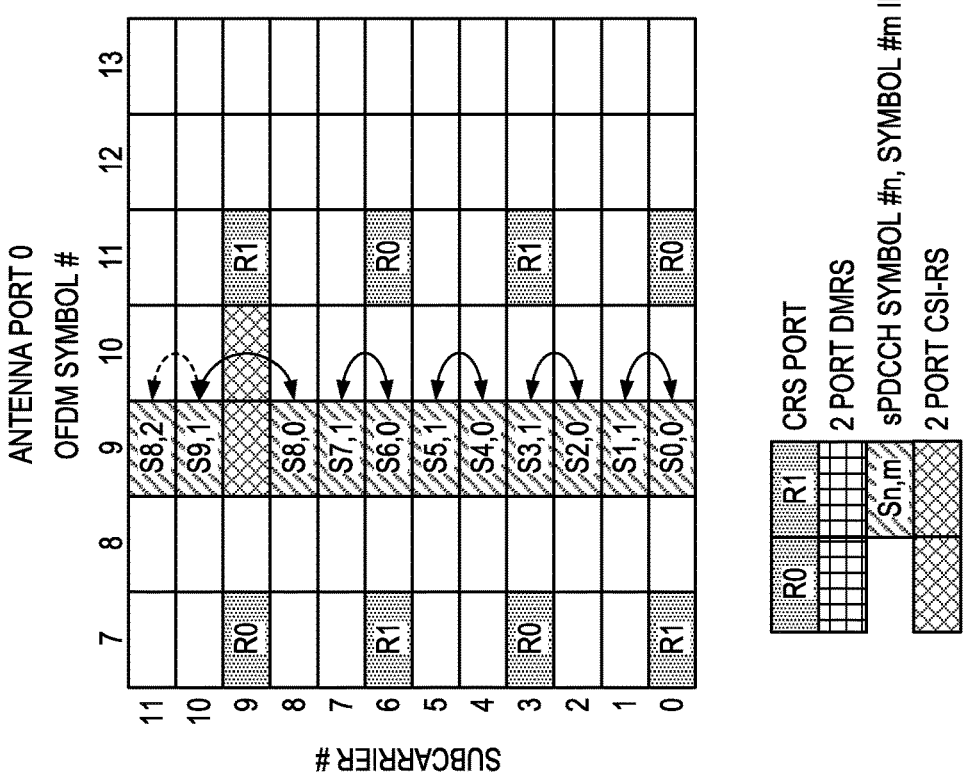
FIG. 14 show a time/frequency grid of a subframe, depicting the pairing of REs when SBC is used and showing the repetition of a symbol according to 4 port CSI-RS, when 2 port CSI-RS is present.
Figure 15A:
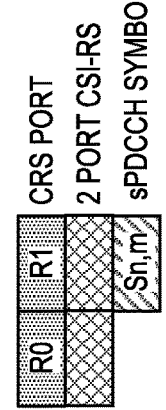
FIGS. 15a and 15b depict four time/frequency grids of a subframe for four antenna ports, depicting the pairing of REs when SFBC+FSTD is used and showing the repetition of a symbol for each antenna port, wherein a normal group has four symbols and an orphan group has three symbols.
Figure 15A:
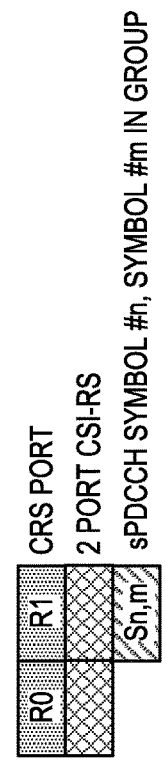
Figure 15B:
Figure 15B:
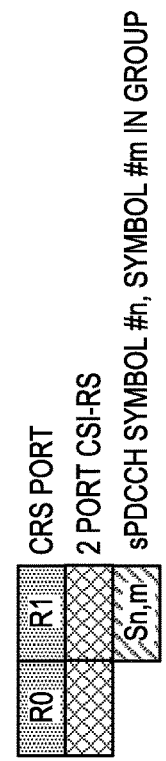
Figure 16A:
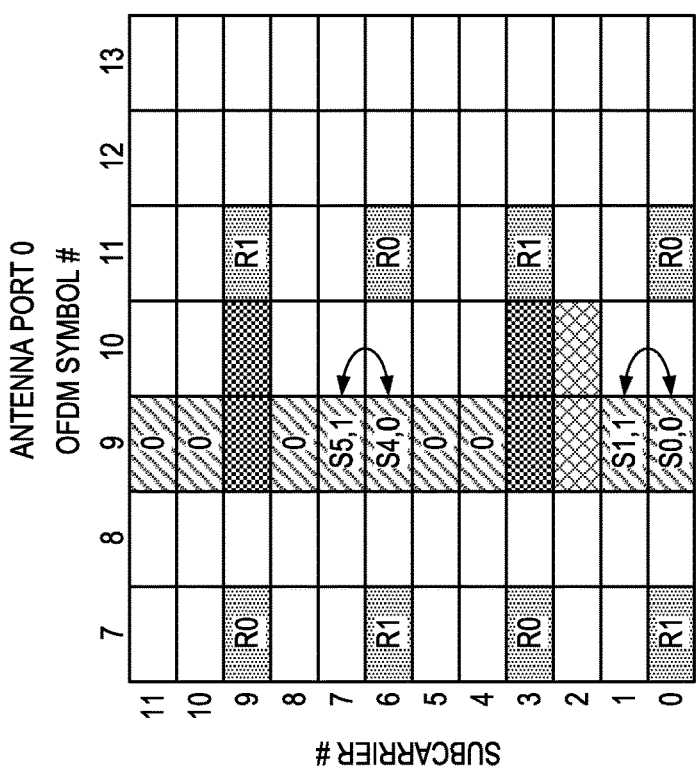
FIGS. 16a and 16b depict four time/frequency grids of a subframe for four antenna ports, depicting the pairing of REs when SFBC+FSTD is used and showing the repetition of a symbol for each antenna port, wherein a normal group has four symbols and an orphan group has five symbols.
Figure 16A:
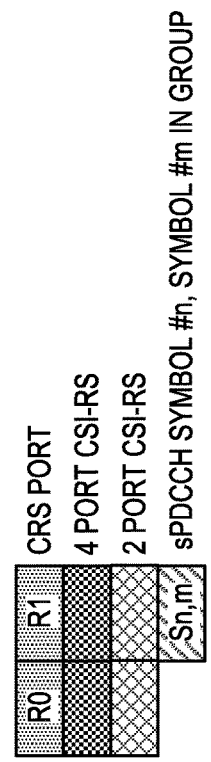
Figure 16A:
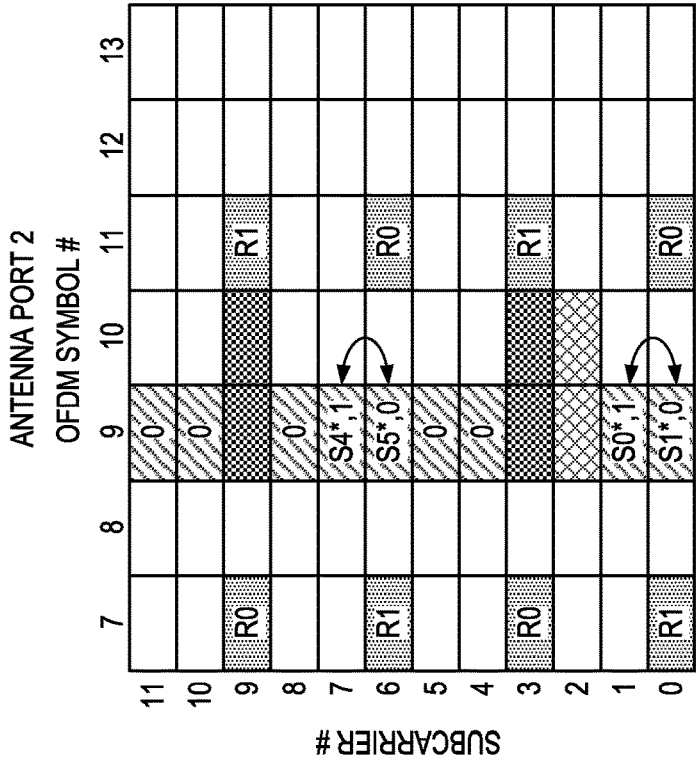
Figure 16A:
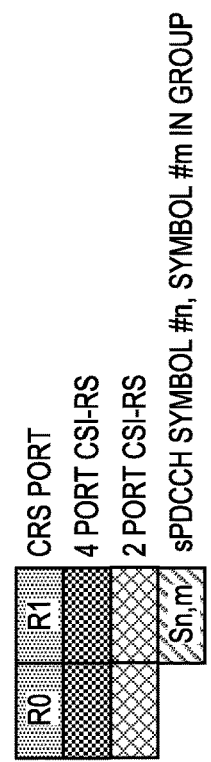
Figure 16B:
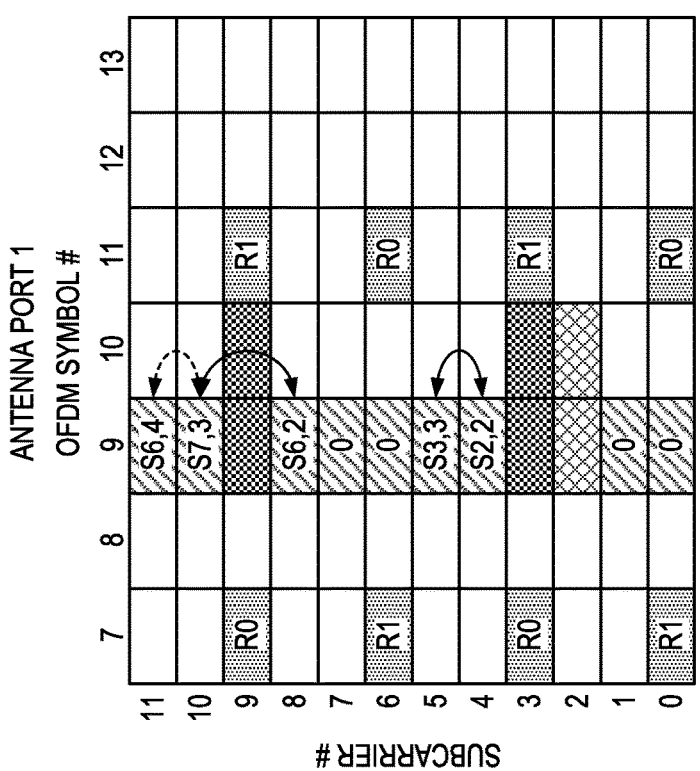

FIG. 14 depicts an embodiment wherein when a 2 port CSI-RS is present, the repeated RE is determined according to where a 4 port CSI-RS would be mapped. Such a mapping may be advantageous to the UE, since in this case the SFBC symbol pair locations are the same when either 2 port or 4 port CSI-RS are present. When 2 port CSI-RS is present, there is a repeated symbol in the group mapped to where the lower indexed subcarriers of the 4 port CSI-RS would be. This means that if the UE has sufficient sensitivity to receive the sPDCCH without using the repeated symbol, it can ignore the repeated symbol, and receive the sPDCCH as though 4 port CSI-RS were present.

Four port SFBC used with FSTD uses SFBC on pairs of antenna ports, while blanking out every other pair of REs on an antenna, as discussed above, and shown in FIG. 15. The SFBC pairing per antenna makes it possible to extend the 2 port SFBC embodiments above to 4 port SFBC+FSTD.

Therefore, in one embodiment. starting with the lowest subcarrier index, REs on each antenna port are grouped into $$N_g = \text{round}\left(\frac{N_s}{4}\right)$$

groups, where round (x) rounds to the nearest integer and rounds up at ½, and $N_s$ is the number of REs available to the sPDCCH in each PRB. If $N_s$ is an odd number, then one group (the 'orphan group') will have either 3 or 5 REs. One modulation symbol in an RE of the 'orphan' group is repeated, replacing the contents of an empty RE (one with a '0') with the repeated modulation symbol. The RE containing the repeated modulation symbol is close to the RE containing the symbol it is repeated from, in order to keep the channel response of the two symbols sufficiently similar.

In the example embodiment, there is one CSI-RS RE mapped in an OFDM symbol containing sPDCCH, leaving Ns=11 REs for sPDCCH. There are then $$N_g = \text{round}\left(\frac{11}{4}\right) = 3$$

groups, where the 'orphan' group comprises 3 REs and the rest have 4 REs. After repeating the modulation symbol in the orphan group, the groups are composed of the following modulation symbols, where each group is enclosed in { }: ({S0,0; S1,1; 0; 0},{S4,0; S5,1; 0; 0},{S8,0; S9,1; S8,2}) on antenna port 0, ({S1*,0; S0*,1; 0; 0},{S5*,0; S4*,1; 0; 0},{S9*,0; S8*,1; S9*,2}) on antenna port 2, ({0; 0; S2,2; S3,3},{0; 0; S6,2; S7,3},{0; 0; 0}) on antenna port 1, and ({0; 0; S3*,2; S2*,3},{0; 0; S7*,2; S6*,3},{0; 0; 0}) on antenna port 3. In this embodiment, the repetition operation is the same on all antenna ports; here the same symbol in a group (symbol number 0) is repeated on each antenna port, and copied to the last symbol (symbol number 2) on each antenna port. The repetitions in the last RE of each group can be paired with the penultimate RE of each group, as indicated by the dashed arrows. This minimizes any channel variation between modulation symbols carried in the last and penultimate REs.

In another embodiment, the penultimate symbol in the orphan group is repeated to the last RE. Using the example of FIG. 15, S9,1 and S8*,1 on antenna ports 0 and 2, and the zeroes in subcarrier 10 on antenna ports 1 and 3, respectively, would be repeated.

In FIG. 15, there are 7 non-zero symbols on antenna ports 0 and 2, while there are only 4 on antenna ports 1 and 3. This may limit the diversity gain, since some antennas carry more symbols than others. Since sPDCCHs may span multiple PRBs, it is possible to vary the 4 port TxD mapping on a per PRB basis. Therefore, in an embodiment, an 'orphan' modulation symbol group comprising M modulation symbols and $M_{nz}$<M non-zero amplitude modulation symbols, is mapped to a first antenna port in a first PRB and to a second antenna port in a second PRB.

FIG. 16 depicts the operation of the SFBC+FSTD 4 port embodiment when $N_s$ is odd, but the number of REs in the 'orphan' group is 5. Since a two port and a 4 port CSI-RS are present in an OFDM symbol carrying sPDCCH, there are $N_s$=9 REs, and therefore there are $$N_g = \text{round}\left(\frac{9}{4}\right) = 2$$

groups, and the 'orphan' group comprises 5 REs while the other group has 4 REs. After repeating the modulation symbol in the orphan group, the groups are composed of the following modulation symbols: ({S0,0; S1,1; 0; 0},{S4,0; S5,1; 0; 0; 0}) on antenna port 0, ({S1*,0; S0*,1; 0; 0},{S5*,0; S4*,1; 0; 0; 0}) on antenna port 2, ({0; 0; S2,2; S3,3},{0; 0; S6,2; S7,3; S6,4}) on antenna port 1, and ({0; 0; S3*,2; S2*,3},{0; 0; S7*,2; S6*,3,S7*,4}) on antenna port 3. As above, the repetition operation is the same on all antenna ports; here the same symbol in a group (symbol number 3) is repeated on each antenna port, and copied to the last symbol (symbol number 4) on each antenna port. The repetitions in the last RE of each group can be paired with the penultimate RE of each group, as indicated by the dashed arrows.

In some embodiments, when $N_s$ is an even number, but not an even multiple of 4, and modulation symbol group sizes are typically 4, then an 'orphan' symbol group can have 2 modulation symbols. In this case, it is not necessary to repeat the modulation symbols, since there is a complete SFBC pair on each antenna. Therefore, when $N_s$ is an even number, and an 'orphan' group has two REs, the first two symbols of the SFBC+FSTD mapping are used for the orphan group.

Figure 17A:
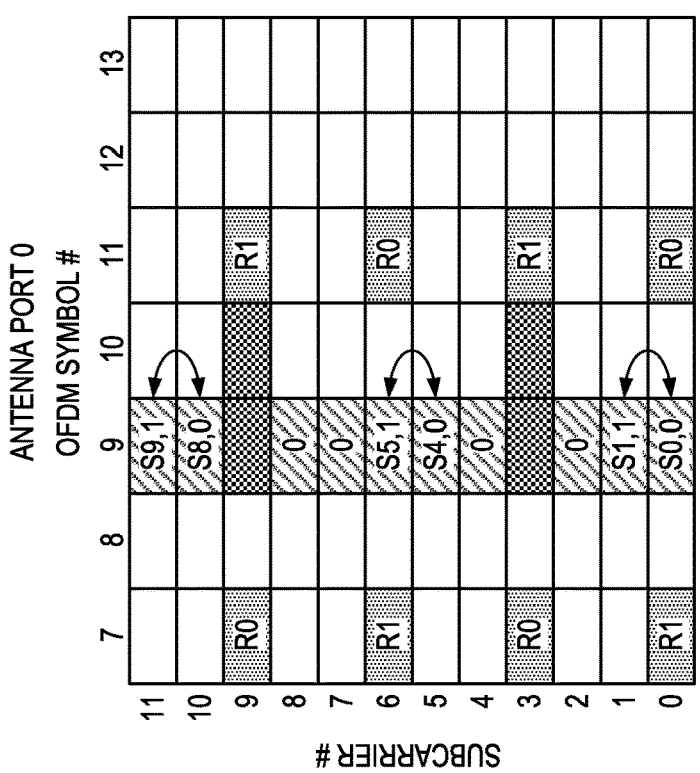
FIGS. 17a and 17b depict four time/frequency grids of a subframe for four antenna ports, depicting the pairing of REs when SFBC+FSTD is used and showing that no repetition of a symbol is required, wherein a normal group has four symbols and an orphan group has two symbols.
Figure 17B:
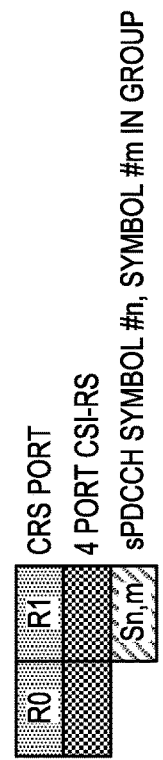
Figure 17B:
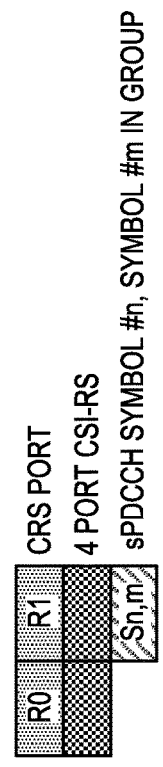
Figure 18A:
FIGS. 18a and 18b depict four time/frequency grids of a subframe for four antenna ports, depicting the pairing of REs when SFBC+FSTD is used, and wherein each RE group has a different number of symbols, better balancing the discrepancy between antenna ports than in the case depicted in FIG. 15.
Figure 18A:
Figure 18A:
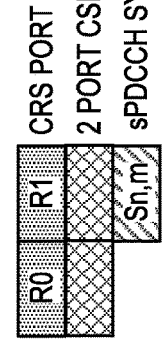
Figure 18B:
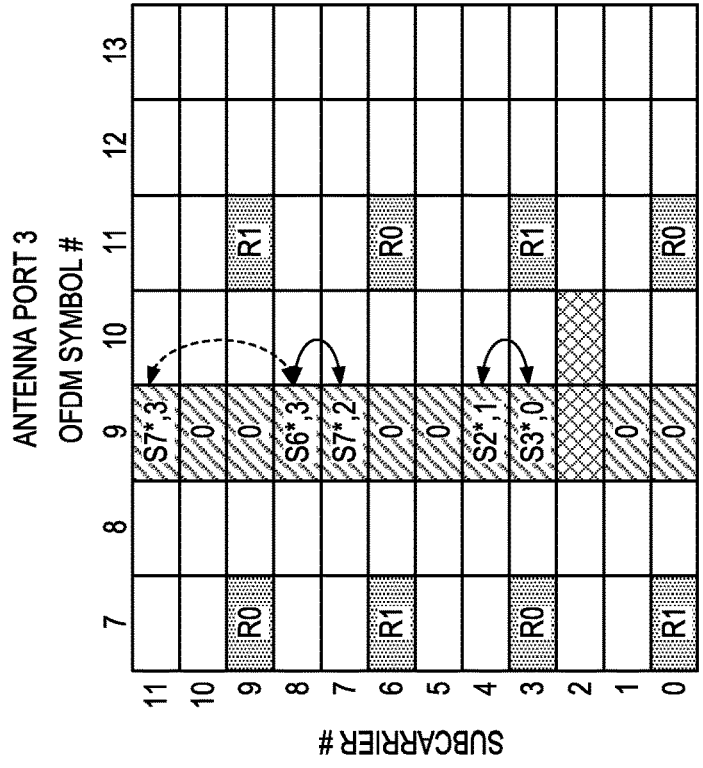
Figure 18B:
Figure 18B:
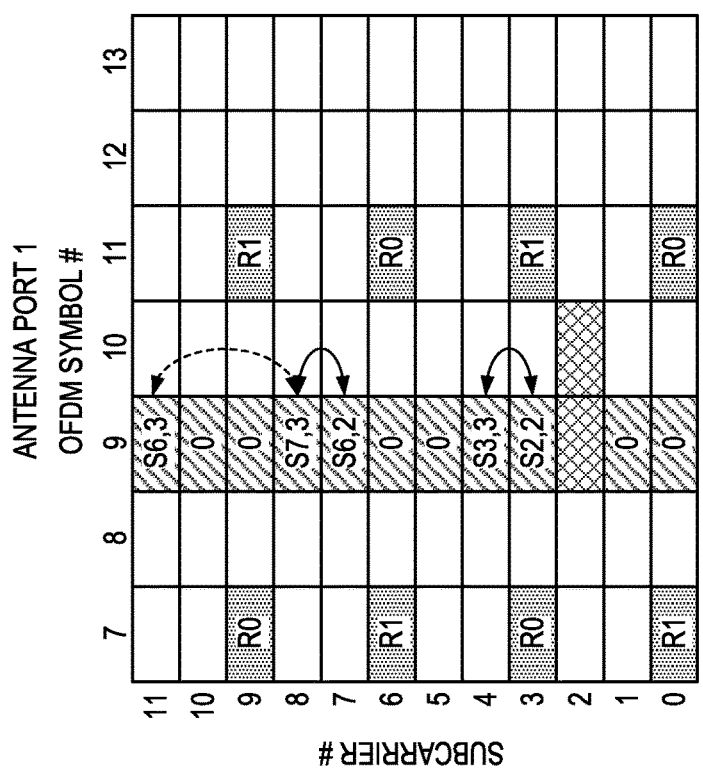
Figure 18B:

This embodiment illustrated in FIG. 17. Since a 4 port CSI-RS is present in an OFDM symbol carrying sPDCCH, there are $N_s$=10 REs, and therefore there are $$N_g = \text{round}\left(\frac{10}{4}\right) = 3$$

groups, and the 'orphan' group comprises 2 REs while the other groups have 4 REs. After repeating the modulation symbol in the orphan group, the groups are composed of the following modulation symbols: ({S0,0; S1,1; 0; 0},{S4,0; S5,1; 0;},{S8,0; S9,1}) on antenna port 0, ({S1*,0; S0*,1; 0; 0},{S5*,0; S4*,1; 0; 0},{S9*,0; S8*,1}) on antenna port 2, ({0; 0; S2,2; S3,3},{0; 0; S6,2; S7,3},{0; 0}) on antenna port 1, and ({0; 0; S3*,2; S2*,3},{0; 0; S7*,2; S6*,3},{0; 0}) on antenna port 3.

In some embodiments of 4 port TxD, when $N_s$ is an odd number, it may be desirable to have two RE groups that are not the typical size of 4 REs. This may allow a more even distribution of modulation symbols on the antenna ports. As seen in FIG. 15, when $N_s$=11 and there is one orphan RE group of size 3, there can be 7 non-zero symbols on antenna ports 0 and 2, while there are only 4 on antenna ports 1 and 3. Another embodiment is shown in FIG. 18, where the RE groups have 3 different sizes, comprising 2, 4, and 5 REs, as opposed to the prior embodiments. The RE groups consist of symbols ({S0,0; S1,1; 0; 0},{S4,0; S5,1; 0; 0; 0};{S8,0; S9,1}) on antenna port 0, ({S1*,0; S0*,1; 0; 0},{S5*,0; S4*,1; 0; 0; 0};{S9*,0; S8*,1}) on antenna port 2, ({0; 0; S2,2; S3,3; 0; 0},{S6,2; S7,3; 0; 0; S6,3};{0; 0}) on antenna port 1, and ({0; 0; S3*,2; S2*,3; 0; 0},{S7*,2; S6*,3; 0; 0; S7*,3};{0; 0}) on antenna port 3. Unlike other embodiments discussed above, the second group contains the repeated modulation symbol, and the repeated modulation symbol is mapped to a subcarrier that is after the subcarriers containing modulation symbols of another RE group. In other words, on antenna ports 1 and 3, S6,3 and S7*,3 in subcarrier 11 from the second group follow the zeroes in the third group occupying subcarriers 9 and 10. The number of non-zero modulation ports on antenna ports 0 and 2 is 6, and 5 on antenna ports 1 and 3, which is more balanced than when RE group sizes of 4 and 3 are used in the example of FIG. 15.

Figure 19:
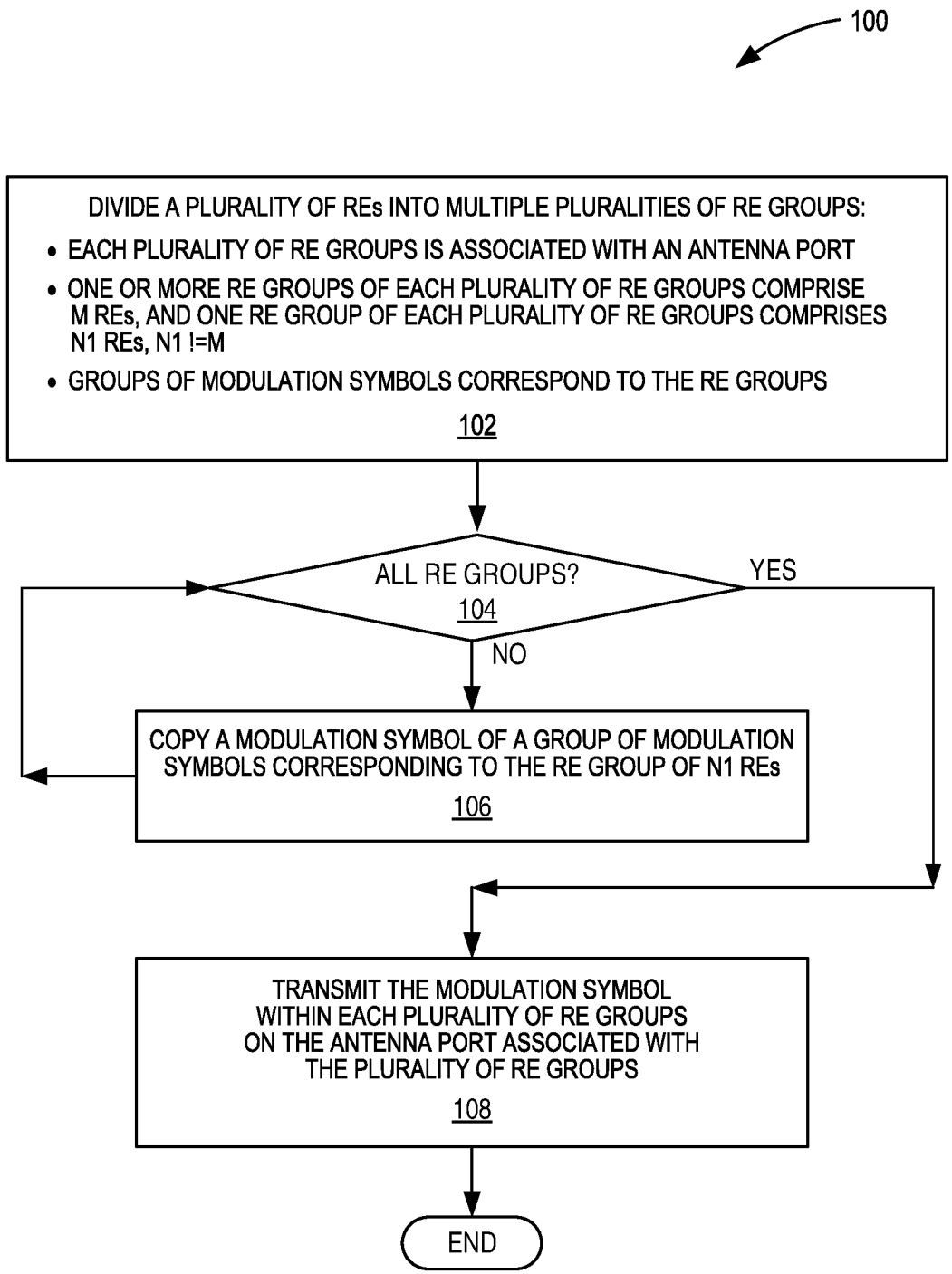
FIG. 19 depicts a method of selectively repeating a modulation symbol in an antenna diversity transmission of a control channel.

FIG. 19 depicts a method 100, performed by a base station operative in a wireless communication network, of selectively repeating a modulation symbol in an antenna diversity transmission of a control channel. A plurality of REs are divided into multiple pluralities of RE groups (block 102). The division into RE groups conforms to the following properties:

each plurality of RE groups is associated with an antenna port,
  one or more RE groups of each plurality of RE groups comprise M REs, and one RE group of each plurality of RE groups comprises N1 REs, where N1 differs from M, and
  groups of modulation symbols correspond to the RE groups.

For each plurality of RE groups (block 104), a modulation symbol of a group of modulation symbols corresponding to the RE group of N1 REs is copied (block 106), and the modulation symbols within each plurality of RE groups are transmitted on the antenna port associated with the plurality of RE groups (block 108). This occurs (in general, simultaneously) until each plurality of RE groups has been processed and transmitted, when the method ends for that particular transmission.

Figure 20:
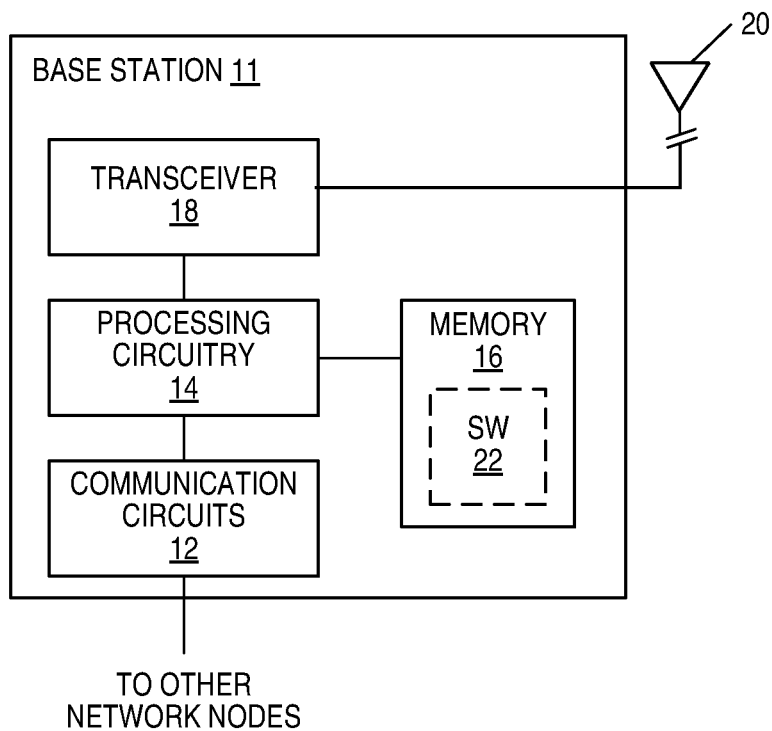
FIG. 20 is a block diagram of a base station.

FIG. 20 depicts a base station 11, such as an eNB, operative in a wireless communication network, such as LTE. The base station 11 includes communication circuits 12 operative to exchange data with other network nodes; processing circuitry 14; memory 16; and radio circuits, such as a transceiver 18, one or more antennas 20, and the like, to effect wireless communication across an air interface to one or more UEs. As indicated by the broken connection to the antenna(s) 20, the antenna(s) may be physically located separately from the base station 31, such as mounted on a tower, building, or the like. Although the memory 16 is depicted as being separate from the processing circuitry 14, those of skill in the art understand that the processing circuitry 14 includes internal memory, such as a cache memory or register file. Those of skill in the art additionally understand that virtualization techniques allow some functions nominally executed by the processing circuitry 14 to actually be executed by other hardware, perhaps remotely located (e.g., in the so-called "cloud").

According to one embodiment of the present invention, the processing circuitry 14 is operative to cause the base station 31 to divide REs into groups for each antenna port, one such group having a different number of REs, and assign associated modulation symbols to the REs in the groups, as described and claimed herein. In particular, the processing circuitry 14 is operative to perform the method 100 described and claimed herein.

Figure 21:
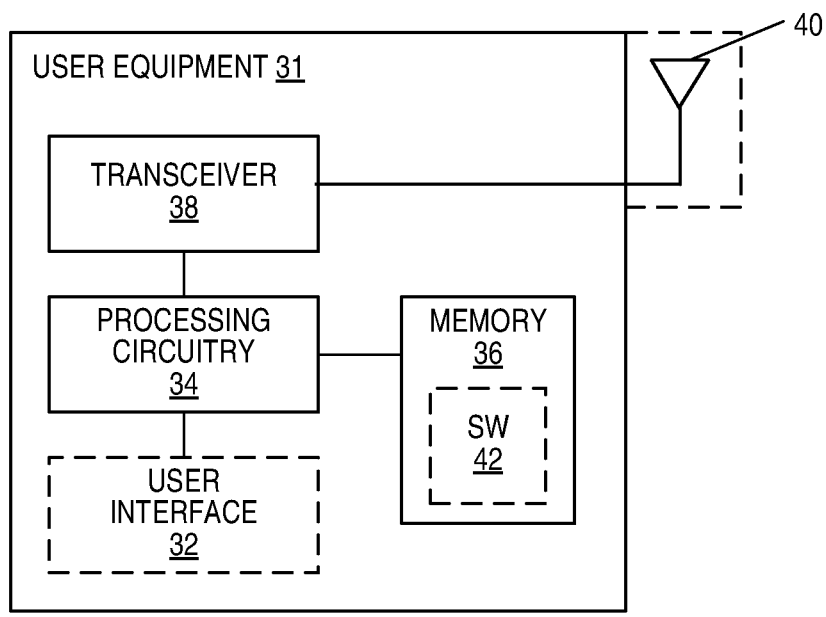
FIG. 21 is a block diagram of user equipment.

FIG. 21 depicts a UE 31 operative in a wireless communication network, such as LTE. A UE 31 is any type device capable of communicating with a base station 11 using radio signals. A UE 31 may therefore refer to a machine-to-machine (M2M) device, a machine-type communications (MTC) device, a Narrowband Internet of Things (NB IoT) device, etc. The UE 31 may also be a conventional wireless communication network mobile terminal, such as a cellular telephone or "smartphone." A UE 31 may also be referred to as a radio device, a radio communication device, a radio network device, a wireless terminal, or simply a terminal—unless the context indicates otherwise, the use of any of these terms is intended to include device-to-device UEs or devices, machine-type devices, or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs 31, but may be configured to transmit and/or receive data without direct human interaction.

In some embodiments, the UE 31 includes a user interface 32 (display, touchscreen, keyboard or keypad, microphone, speaker, and the like); in other embodiments, such as in many M2M, MTC, or NB IoT scenarios, the UE 31 may include only a minimal, or no, user interface 22 (as indicated by the dashed lines of block 22 in FIG. 21). The UE 31 also includes processing circuitry 34; memory 36; and radio circuits, such a transceiver 38, one or more antennas 40, and the like, to effect wireless communication across an air interface to one or more base stations 11. As indicated by the dashed lines, the antenna(s) 40 may protrude externally from the UE 31, or the antenna(s) 40 may be internal. As known in the art, the UE 31 may additionally include features such as a camera, accelerometer, satellite navigation signal receiver circuitry, vibrating motor, and the like (not depicted in FIG. 21).

In all embodiments, the processing circuitry 14, 34 may comprise any sequential state machine operative to execute machine instructions stored as machine-readable computer programs in memory 16, 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

In all embodiments, the memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 18, 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, or the like. The transceiver 18, 38 implements transmitter and receiver functionality appropriate to the RAN links (e.g., frequency allocations and the like). The transmitter and receiver functions may share circuit components and/or software, or alternatively may be implemented separately.

In all embodiments, the communication circuits 12 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Embodiments of the present invention present numerous advantages over the prior art. All available symbols in a PRB for sPDCCH can be used for SBC transmission of sPDCCH, thereby allowing fewer resources to be used for a given level of sPDCCH reliability. Also, when sPDSCHs of multiple UEs may be multiplexed with one sPDSCH, the variation in the number of sPDSCH SFBC RE pairs in each PRB of an sPDCCH can be minimized. Furthermore, UEs can receive an sPDCCH that triggers aperiodic CSI-RS in the same subframe as the sPDCCH.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Enumerated Embodiments

Some specific, enumerated embodiments of the present invention include:

1. A method, performed by a base station operative in a wireless communication network, of selectively repeating a modulation symbol in an antenna diversity transmission of a control channel, comprising:
dividing a plurality of Resource Elements (REs) into multiple pluralities of RE groups, wherein
each plurality of RE groups is associated with an antenna port,
one or more RE groups of each plurality of RE groups comprise M REs, and one RE group of each plurality of RE groups comprises N1 REs, where N1 differs from M, and
groups of modulation symbols correspond to the RE groups; and
for each plurality of RE groups,
copying a modulation symbol of a group of modulation symbols corresponding to the RE group of N1 REs; and
transmitting the modulation symbols within each plurality of RE groups on the antenna port associated with the plurality of RE groups.

2. The method of embodiment 1 further comprising:
transmitting the copied modulation symbol in a subcarrier adjacent to a subcarrier in which modulation symbol that is not copied is transmitted.

3. The method of embodiment 1 wherein the copied modulation symbol occupies the last RE of the group of N1 REs, and the modulation symbol that is copied occupies a subcarrier adjacent to the subcarrier occupied by the copied modulation symbol.

4. The method of embodiment 1 wherein an RE group of the plurality of RE groups comprises N2 REs, where N2 differs from N1.

5. The method of embodiment 1, wherein the modulation symbols within each RE group of N1 REs transmitted on
a first antenna port and a first set of subcarriers comprises a first number of non-zero modulation symbols;
a second antenna port and the first set of subcarriers comprises a second number of non-zero modulation symbols;
the first antenna port and a second set of subcarriers comprises the second number of non-zero modulation symbols; and
the second antenna port and the second set of subcarriers comprises the first number of non-zero modulation symbols.

6. The method of embodiment 1, further comprising:
transmitting a P port reference signal and the downlink control channel in a first subcarrier of an OFDM symbol;
transmitting a repeated modulation symbol of one of the RE groups of N1 REs in a second subcarrier of the OFDM symbol corresponding to a 2P port reference signal, where the 2P port reference signal would occupy the first subcarrier of the OFDM symbol.

7. A method of receiving a control channel in a User Equipment (UE) operative in a wireless communication network, comprising:
assuming that a predetermined number of Demodulation Reference Signal (DMRS) Resource Elements (REs) used for reception of a different physical channel than the control channel are present in each Orthogonal Frequency Division Multiplexing (OFDM) symbol carrying the control channel.

8. A method of receiving a control channel in a User Equipment (UE) operative in a wireless communication network, comprising:
identifying which Resource Elements (REs) contain the control channel and which contain a reference signal not used for reception of the control channel according to when the reference signal is not present in the REs; and receiving control channel information carried in the control channel that indicates the presence of the reference signal in set of Orthogonal Frequency Division Multiplexing (OFDM) symbols, the set of OFDM symbols containing the REs.

9. A base station operative in a wireless communication network, comprising:
   one or more antennas;
   a transceiver operatively connected to the antennas; and
   processing circuitry operatively connected to the transceiver, and operative to:
      divide a plurality of Resource Elements (REs) into multiple pluralities of RE groups, wherein
         each plurality of RE groups is associated with an antenna port,
         one or more RE groups of each plurality of RE groups comprise M REs, and one RE group of each plurality of RE groups comprises N1 REs, where N1 differs from M, and
         groups of modulation symbols correspond to the RE groups; and
      for each plurality of RE groups,
         copy a modulation symbol of a group of modulation symbols corresponding to the RE group of N1 REs; and
         transmit the modulation symbols within each plurality of RE groups on the antenna port associated with the plurality of RE groups.

10. A User Equipment (UE) operative in a wireless communication network, comprising:
    one or more antennas;
    a transceiver operatively connected to the antennas; and
    processing circuitry operatively connected to the transceiver, and operative to receive a control channel by:
       identifying which Resource Elements (REs) contain the control channel and which contain a reference signal not used for reception of the control channel according to when the reference signal is not present in the REs; and
       receiving control channel information carried in the control channel that indicates the presence of a reference signal in set of Orthogonal Frequency Division Multiplexing (OFDM) symbols, the set of OFDM symbols containing the REs.

11. A method, performed by a User Equipment (UE) operative in a wireless communication network, of receiving a control channel wherein a modulation symbol in an antenna diversity transmission of the control channel has been selectively repeated, comprising:
    dividing a plurality of Resource Elements (REs) into multiple pluralities of RE groups, wherein
       each plurality of RE groups is associated with an antenna port,
       one or more RE groups of each plurality of RE groups comprise M REs, and one RE group of each plurality of RE groups comprises N1 REs, where N1 differs from M, and
       groups of modulation symbols correspond to the RE groups; and
    for each plurality of RE groups,
       determining that a modulation symbol of a group of modulation symbols corresponding to the RE group of N1 REs has been copied; and
       receiving the modulation symbols within each plurality of RE groups, wherein the modulation symbols within each plurality of RE groups have been transmitted on the antenna port associated with the plurality of RE groups.

What is claimed is:

1. A method, performed by a base station operative in a wireless communication network, of selectively repeating a modulation symbol in an antenna diversity transmission of a control channel, the method comprising:
   dividing a plurality of Resource Elements (REs) into multiple pluralities of RE groups, wherein:
      each plurality of RE groups is associated with an antenna port;
      one or more RE groups of each plurality of RE groups comprise a positive number M of REs, and at least one RE group of each plurality of RE groups comprises a positive number N1 of REs; and
      groups of modulation symbols correspond to the RE groups;
   for each plurality of RE groups, repeating a modulation symbol of a group of modulation symbols corresponding to the RE group of N1 REs; and
   transmitting the modulation symbols within each plurality of RE groups on the antenna port associated with the plurality of RE groups.

2. The method of claim 1, wherein N1 differs from M.

3. The method of claim 1, further comprising:
   transmitting the copied modulation symbol in a subcarrier adjacent to a subcarrier in which a modulation symbol that is not copied is transmitted.

4. The method of claim 1, wherein the copied modulation symbol occupies the last RE of the group of N1 REs, and the modulation symbol that is copied occupies a subcarrier adjacent to the subcarrier occupied by the copied modulation symbol.

5. The method of claim 1, wherein an RE group of the plurality of RE groups comprises N2 REs, where N2 differs from N1.

6. The method of claim 1, wherein the modulation symbols within each RE group of N1 REs are transmitted on:
   a first antenna port and a first set of subcarriers comprises a first number of non-zero modulation symbols;
   a second antenna port and the first set of subcarriers comprises a second number of non-zero modulation symbols;
   the first antenna port and a second set of subcarriers comprises the second number of non-zero modulation symbols; and
   the second antenna port and the second set of subcarriers comprises the first number of non-zero modulation symbols.

7. The method of claim 1, further comprising:
   transmitting an integer P port reference signal and the downlink control channel in a first subcarrier of an Orthogonal Frequency Division Multiplex (OFDM) symbol; and
   transmitting a repeated modulation symbol of one of the RE groups of N1 REs in a second subcarrier of the OFDM symbol corresponding to a 2P port reference signal, where the 2P port reference signal would occupy the first subcarrier of the OFDM symbol.

8. A base station operative in a wireless communication network, comprising:
   one or more antennas;
   a transceiver operatively connected to the antennas; and processing circuitry operatively connected to the transceiver, and operative to:
divide a plurality of Resource Elements (REs) into multiple pluralities of RE groups, wherein:
each plurality of RE groups is associated with an antenna port;
one or more RE groups of each plurality of RE groups comprise a positive number M of REs, and one RE group of each plurality of RE groups comprises a positive number N1 of REs; and
groups of modulation symbols correspond to the RE groups;
for each plurality of RE groups, repeat a modulation symbol of a group of modulation symbols corresponding to the RE group of N1 REs; and
transmit the modulation symbols within each plurality of RE groups on the antenna port associated with the plurality of RE groups.

9. The base station of claim 8, wherein N1 differs from M.

10. The base station of claim 8, wherein the processing circuitry is further operative to:
transmit the copied modulation symbol in a subcarrier adjacent to a subcarrier in which a modulation symbol that is not copied is transmitted.

11. The base station of claim 8, wherein the copied modulation symbol occupies the last RE of the group of N1 REs, and the modulation symbol that is copied occupies a subcarrier adjacent to the subcarrier occupied by the copied modulation symbol.

12. The base station of claim 8, wherein an RE group of the plurality of RE groups comprises N2 REs, where N2 differs from N1.

13. The base station of claim 8, wherein the modulation symbols within each RE group of N1 REs are transmitted on:
a first antenna port and a first set of subcarriers comprises a first number of non-zero modulation symbols;
a second antenna port and the first set of subcarriers comprises a second number of non-zero modulation symbols;
the first antenna port and a second set of subcarriers comprises the second number of non-zero modulation symbols; and
the second antenna port and the second set of subcarriers comprises the first number of non-zero modulation symbols.

14. The base station of claim 8, wherein the processing circuitry is further operative to:
transmit an integer P port reference signal and the downlink control channel in a first subcarrier of an Orthogonal Frequency Division Multiplex (OFDM1 symbol; and
transmit a repeated modulation symbol of one of the RE groups of N1 REs in a second subcarrier of the OFDM symbol corresponding to a 2P port reference signal, where the 2P port reference signal would occupy the first subcarrier of the OFDM symbol.

15. A method, performed by a User Equipment (UE) operative in a wireless communication network, of receiving a control channel wherein a modulation symbol in an antenna diversity transmission of the control channel has been selectively repeated, the method comprising:
dividing a plurality of Resource Elements (REs) into multiple pluralities of RE groups, wherein:
each plurality of RE groups is associated with an antenna port,
one or more RE groups of each plurality of RE groups comprise a positive number M of REs, and one RE group of each plurality of RE groups comprises a positive number N1 of REs, and
groups of modulation symbols correspond to the RE groups; and
for each plurality of RE groups:
determining that a modulation symbol of a group of modulation symbols corresponding to the RE group of N1 REs has been copied; and
receiving the modulation symbols within each plurality of RE groups, wherein the modulation symbols within each plurality of RE groups have been transmitted on the antenna port associated with the plurality of RE groups.

16. The method of claim 15, wherein N1 differs from M.

17. The method of claim 15, further comprising:
receiving the copied modulation symbol in a subcarrier adjacent to a subcarrier in which a modulation symbol that is not copied was transmitted.

18. The method of claim 15, wherein the copied modulation symbol occupies the last RE of the group of N1 REs, and the modulation symbol that is copied occupies a subcarrier adjacent to the subcarrier occupied by the copied modulation symbol.

19. The method of claim 15, wherein an RE group of the plurality of RE groups comprises N2 REs, where N2 differs from N1.

20. The method of claim 15, further comprising:
receiving an integer P port reference signal and the downlink control channel in a first subcarrier of an Orthogonal Frequency Division Multiplex (OFDM) symbol; and
receiving a repeated modulation symbol of one of the RE groups of N1 REs in a second subcarrier of the OFDM symbol corresponding to a 2P port reference signal, where the 2P port reference signal would occupy the first subcarrier of the OFDM symbol.

* * * * *